US012515292B2

(12) United States Patent
Nordström et al.

(10) Patent No.: US 12,515,292 B2
(45) Date of Patent: Jan. 6, 2026

(54) DEVICE FOR CHANGING ABRADING PRODUCTS

(71) Applicant: Mirka Ltd, Jepua (FI)

(72) Inventors: Caj Nordström, Jeppo (FI); Jani Kahari, Vasa (FI); Andreas Storbjörk, Korsholm (FI)

(73) Assignee: MIRKA LTD, Jepua (FI)

( * ) Notice: Subject to any disclaimer, the term of this patent is extended or adjusted under 35 U.S.C. 154(b) by 817 days.

(21) Appl. No.: 17/428,389

(22) PCT Filed: Feb. 14, 2020

(86) PCT No.: PCT/FI2020/050094

§ 371 (c)(1),
(2) Date: Aug. 4, 2021

(87) PCT Pub. No.: WO2020/169882

PCT Pub. Date: Aug. 27, 2020

(65) Prior Publication Data

US 2022/0118578 A1 Apr. 21, 2022

(30) Foreign Application Priority Data

Feb. 20, 2019 (FI) ..................................... 20195131

(51) Int. Cl.
*B24B 23/00* (2006.01)
*B24B 41/04* (2006.01)
(Continued)

(52) U.S. Cl.
CPC ............ *B24B 23/005* (2013.01); *B24B 41/04* (2013.01); *B24B 45/006* (2013.01); *B24D 9/085* (2013.01);
(Continued)

(58) Field of Classification Search
CPC ........... Y10T 483/174; Y10T 29/49815; Y10T 83/7747; B24D 9/085; B24B 23/005; B24B 45/006; Y10S 83/954
(Continued)

(56) References Cited

U.S. PATENT DOCUMENTS 3,522,681 A * 8/1970 Lampert ................ B24D 9/085 451/490
4,558,542 A * 12/1985 Marton .................. B24D 9/085 451/490
(Continued)

FOREIGN PATENT DOCUMENTS

AT 512464 B1 1/2014
CN 107214620 A 9/2017
(Continued)

OTHER PUBLICATIONS

International Search Report for the corresponding International Application No. PCT/FI2020/050094; Date of Filing: Feb. 14, 2020; Date of Mailing: May 12, 2020; 7 pages.

*Primary Examiner* — Sunil K Singh
*Assistant Examiner* — Michael Vitale
(74) *Attorney, Agent, or Firm* — CANTOR COLBURN LLP

(57) ABSTRACT

The disclosed solution comprises a device for changing abrading products (30), the device (1) comprising a detacher (2) comprising a table (10), a blade (14) adapted to penetrate into between an abrading product (30) and the gripping means (34) of the abrading tool (4), and means (16, 18, 19) to co-planarly adjust the mutual distance (d) between the table (10) and the blade (14) to correspond to the thickness (t) of the abrading product (30) in the absence of the abrading product (30).

9 Claims, 20 Drawing Sheets

Figure 1A:
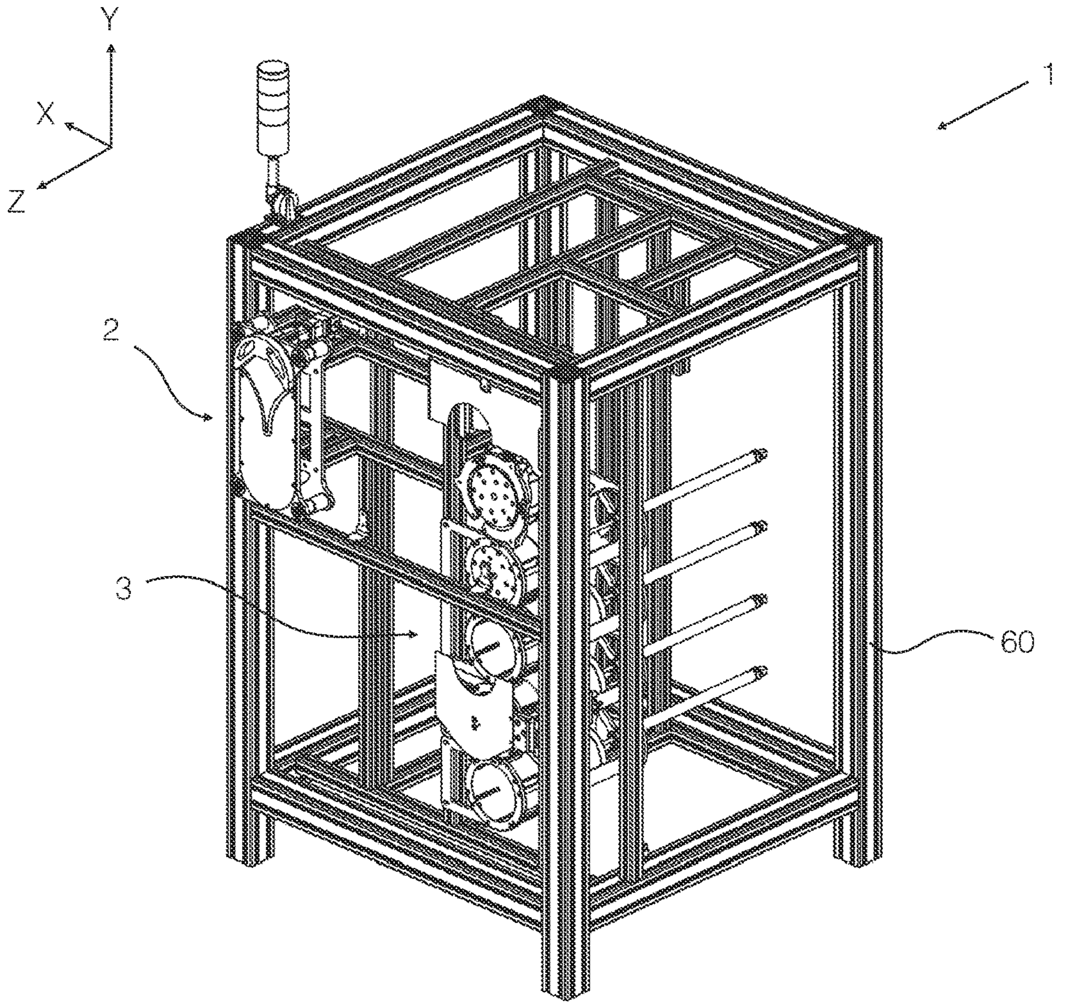

(51) Int. Cl.
*B24B 45/00* (2006.01)
*B24D 9/08* (2006.01)
*B25J 19/00* (2006.01)

(52) U.S. Cl.
CPC ....... *B25J 19/0066* (2013.01); *Y10T 483/174* (2015.01)

(58) Field of Classification Search
USPC ....... 483/33; 451/490, 5, 494; 81/3.27, 3.47, 81/3.48, 3.49, 3.55; 29/426.1; 254/124, 254/133 R; 83/481, 954
See application file for complete search history.

(56) References Cited

U.S. PATENT DOCUMENTS

| | | | | | |
|---|---|---|---|---|---|
| 5,201,149 | A * | 4/1993 | Eisenblatter | B24D 9/085 451/526 |
| 5,231,803 | A * | 8/1993 | Lanzer | B24D 9/085 451/28 |
| 5,482,496 | A * | 1/1996 | Lanzer | B24B 23/03 901/41 |
| 6,264,534 | B1 * | 7/2001 | Panyard | B24B 49/16 451/24 |
| 2004/0048549 | A1 | 3/2004 | Beaudoin et al. | |
| 2012/0142255 | A1 * | 6/2012 | Panergo | B24B 27/0038 451/28 |
| 2013/0324018 | A1 | 12/2013 | Shen | |
| 2015/0328734 | A1 | 11/2015 | Multhammer | |
| 2019/0001460 | A1 | 1/2019 | Staubli | |
| 2019/0152015 | A1 | 5/2019 | Naderer | |
| 2023/0201990 | A1 * | 6/2023 | Tar | B25J 18/04 451/236 |

FOREIGN PATENT DOCUMENTS

| | | | | | |
|---|---|---|---|---|---|
| CN | 206998603 | U | * | 2/2018 | |
| CN | 207239953 | U | | 4/2018 | |
| CN | 108972264 | A | | 12/2018 | |
| CN | 209062834 | U | | 7/2019 | |
| CN | 209095574 | U | | 7/2019 | |
| EP | 2974828 | A1 | | 1/2016 | |
| WO | 2015125068 | A1 | | 8/2015 | |
| WO | WO-2017174512 | A1 | * | 10/2017 | B24B 27/0038 |
| WO | 2019006840 | A1 | | 1/2019 | |

* cited by examiner

DEVICE FOR CHANGING ABRADING PRODUCTS

CROSS-REFERENCE TO RELATED APPLICATIONS

This application is a National Stage application of PCT/FI2020/050094, filed Feb. 14, 2020, which claims benefit of Finnish Application No. 20195131, filed on Feb. 20, 2019, both of which are incorporated by reference herein in their entirety.

FIELD

The solution relates to abrading with an abrading tool, and particularly to changing abrading products for abrading tools.

BACKGROUND

In abrading, abrading products such as abrasive articles and interface pads have to be periodically changed for fresh ones because, during abrading, abrading products are subject to wear, with the result of deterioration in their performance.

Such changing of abrasive articles reduces the output of the abrading process because the abrading process needs to be halted for the duration of changing the worn abrading product(s). Therefore, there is a need for more rapid changing of abrading products in order to improve the productivity of abrading.

Furthermore, especially in robotized or otherwise automated abrading, there is a burden for a human operator to stay available to change an abrading product upon demand by the automated abrading process, which causes burden for the human operator. Or, even if some mechanical assistance was to be available in relieving some such human burden, the human operator is required to adjust such mechanical assistance in accordance of different abrading products required in the process, such as in accordance with different thicknesses of the abrading products changed and/or ensuring proper alignment of aperture patterns in the abrading products and the gripping means on the abrading tool receiving the fresh abrading product which causes burden for the human operator.

Moreover, such abrading increasingly employs net-based abrading articles with no apertures, which may be used in the same process with abrading products comprising apertures possibly with a variety of aperture patterns which entails that any mechanical assistances in the changing of an abrading process specifically designed for a particular aperture pattern are useless in the case of another kind of an aperture pattern or an abrading product with no apertures.

Due to one or more of such deficiencies, fully robotized or otherwise automated abrading process, especially such that utilizes a repertoire of different abrading products with and without apertures in the process, is not possible.

It is an object of the disclosed solution to overcome such problems as outlined above.

SUMMARY OF THE DISCLOSED SOLUTION

The disclosed solution comprises a device for changing abrading products which comprises an abrading product detacher according to the disclosed solution, or which comprises an abrading product attacher according to the disclosed solution, or which includes both the detacher and the attacher according to the disclosed solution.

Both the abrading product detacher and the abrading product attacher may be employed individually without one another in a device for changing abrading products to enhance the efficiency of an abrading process, especially in robotized or otherwise automated abrading for reducing the need for manual intervention even in the case of employing various types of abrading products—perforated and non-perforated. Namely, the abrading product detacher enables efficient and non-manual detaching of abrading products irrespective of their type or thickness. Correspondingly, the abrading product attacher enables efficient and non-manual attaching of abrading products of various types irrespective of their type or thickness.

The abrading product detacher and the abrading product attacher may be employed together in a device for changing abrading products to synergistically bring about even higher level of efficiency and capability to employ various types of abrading products in abrading, especially in robotized or otherwise automated abrading. For example, and as will be elaborated below, employing the abrading product detacher and the abrading product attacher together in a device for changing abrading products enables fully unmanned robotized abrading in which various types of abrading products—for example with varying thicknesses, as well as perforated and non-perforated—are used and changed during abrading.

The disclosed solution comprises a device for changing abrading products, the device comprising a detacher, the detacher comprising: a table for receiving into contact an abrading product as mounted to the gripping means of an abrading tool, the abrading product having a thickness; a blade adapted to penetrate into between the abrading product and the gripping means of the abrading tool; and means to adjust the mutual distance between the table and the blade to correspond to the thickness of the abrading product such that said means are operable in the absence of the abrading product and the blade remains co-planar with the table regardless of their mutual distance.

The disclosed solution also comprises a device for changing abrading products, the device comprising an attacher, the attacher comprising: one or magazines adapted to receive and store a plurality of abrading products; a loading device adapted to receive and hold an abrading product for attachment to an abrading tool; a gripping device comprising gripping means and being adapted to grip an abrading product at the one or more magazines, move from said one or more magazines to the loading device and deposit the abrading product at the loading device.

The disclosed solution also comprises a device for changing abrading products, the device comprising a detacher as described above and an attacher described above. Such a device may further comprise an instructions-giving device in data communication, via communication pathway(s), with the detacher at least for providing instructions for adjusting the mutual distance between the table and the blade, and with the attacher at least for providing instructions for the gripping device for delivering abrading products from the one or more magazines to the loading device.

BRIEF DESRCIPTON OF THE FIGURES

FIG. 1*a* schematically illustrates, according to an example, a device for changing abrading products, the device comprising an abrading product detacher and an abrading product attacher.

Figure 1B:
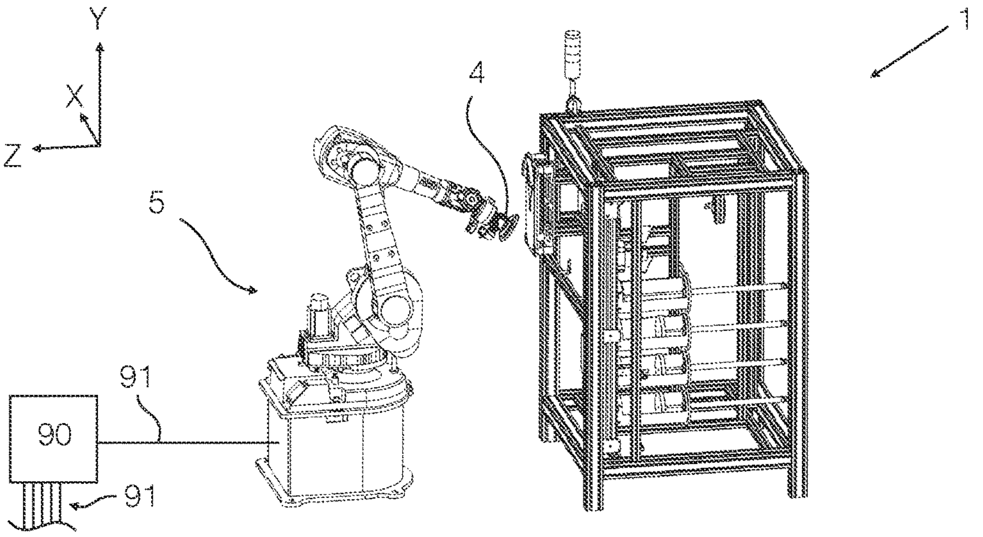

FIG. 1*b* schematically illustrates, the device of FIG. 1*a* with an abrading tool-equipped robot utilizing the abrading product exchanger system.

Figure 2:
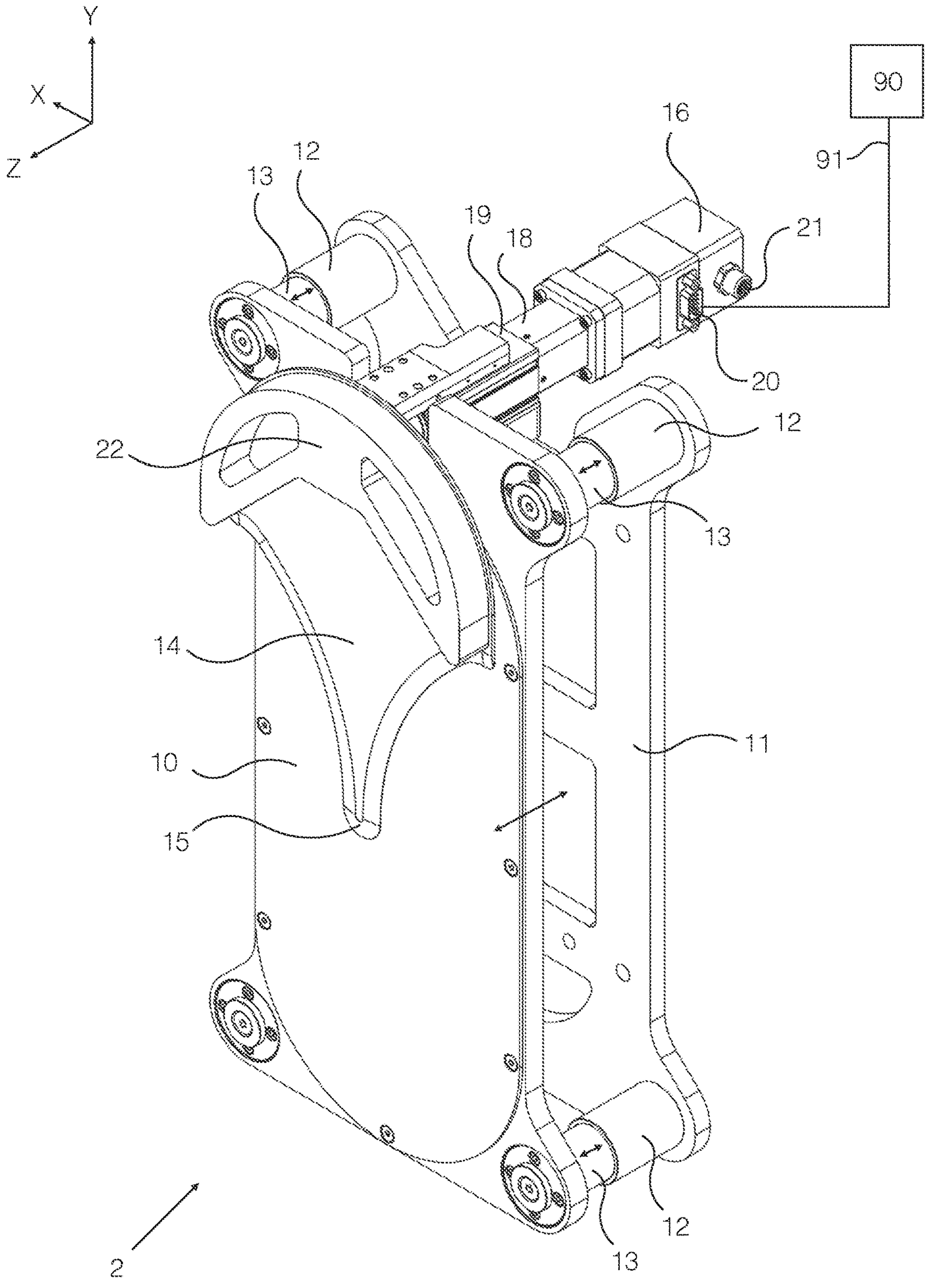

FIG. 2 schematically illustrates, according to an example, an abrading product detacher as viewed from diagonally from the front.

Figure 3:
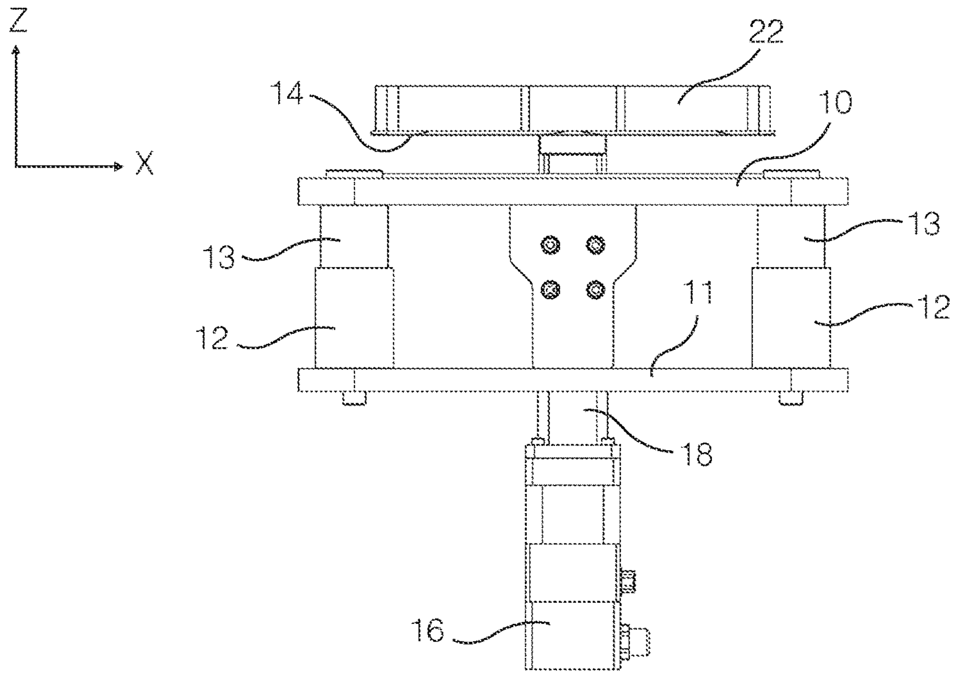

FIG. 3 schematically illustrates the abrading product detacher of FIG. 2 as viewed from below.

Figure 4:
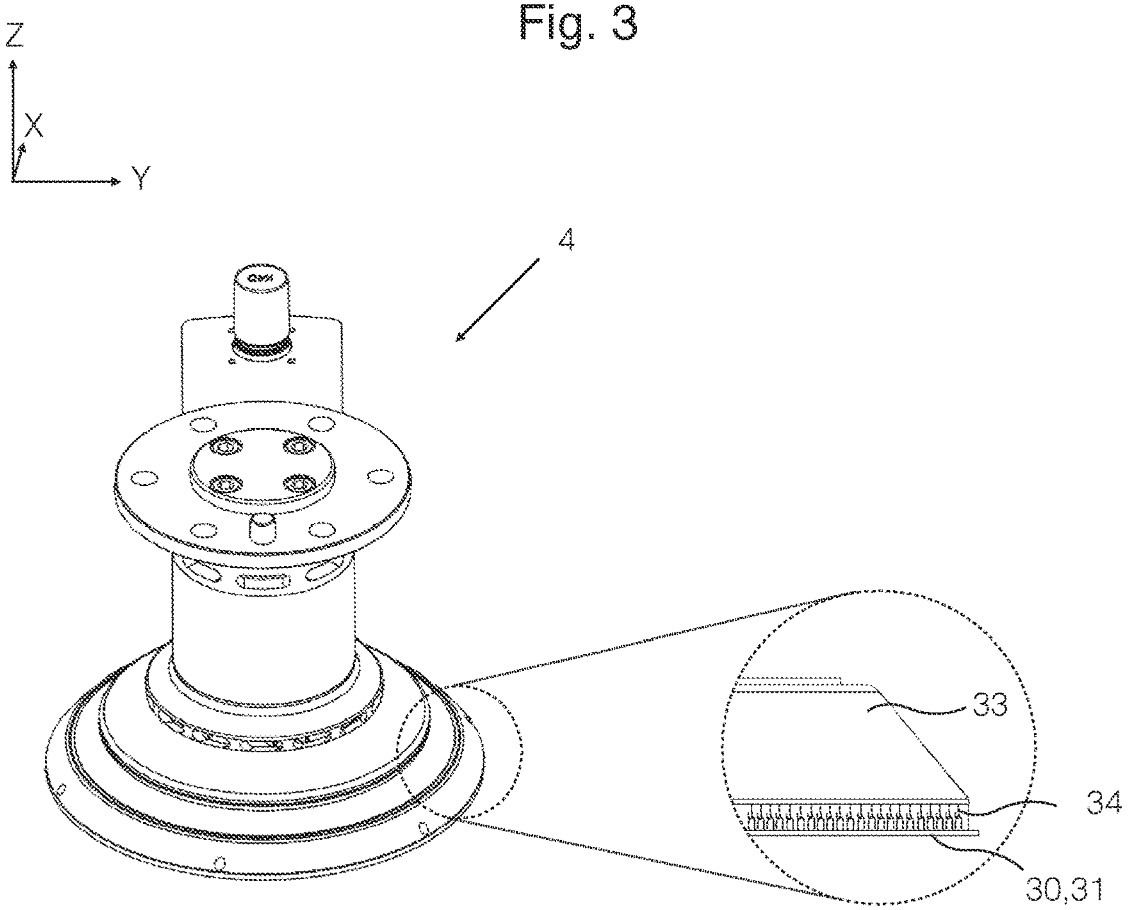

FIG. 4 schematically illustrates, according to an example, and abrading tool equipped with abrading product(s) detachable with an abrading product detacher and attachable with an abrading product attacher according to the disclosed solution.

FIGS. 5*a*-5*h* schematically illustrate, according to an example, stepwise progression of detaching an abrading product, from an abrading tool, with the detacher of FIG. 2, as illustrated from diagonally from the front.

Figure 6A:
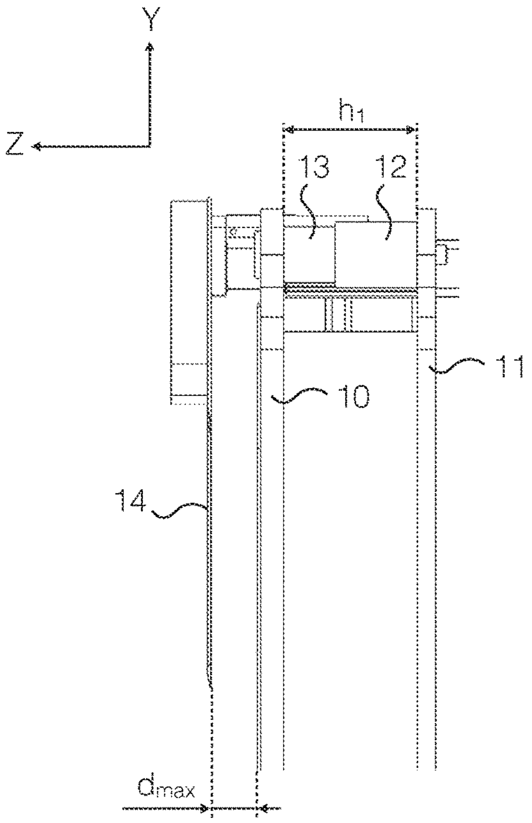
Figure 6B:
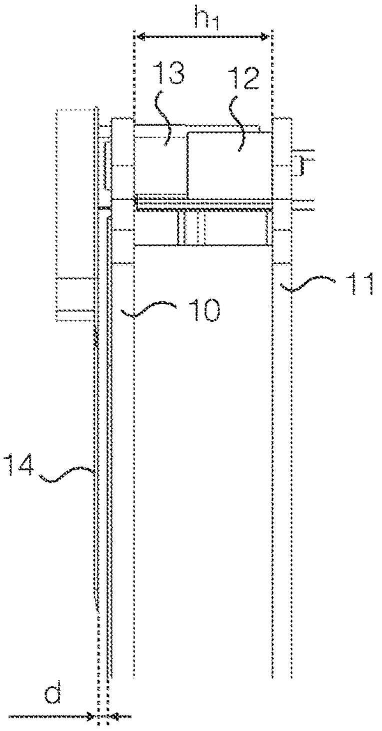
Figure 6C:
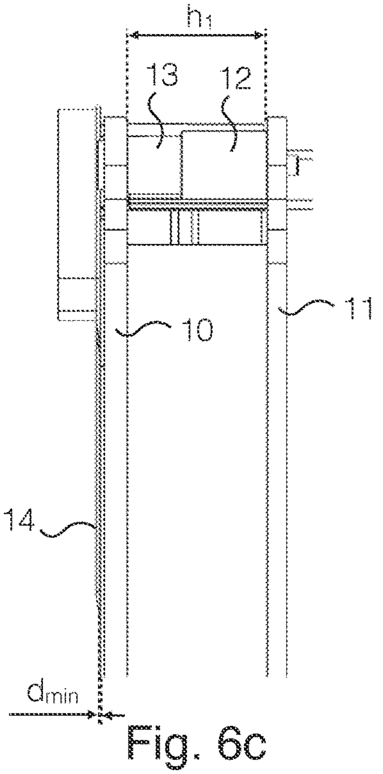

FIGS. 6*a*-6*c* schematically illustrate, in the case of the detacher of FIG. 2, the relative movement of a blade and a table, as viewed from a side.

Figure 7A:
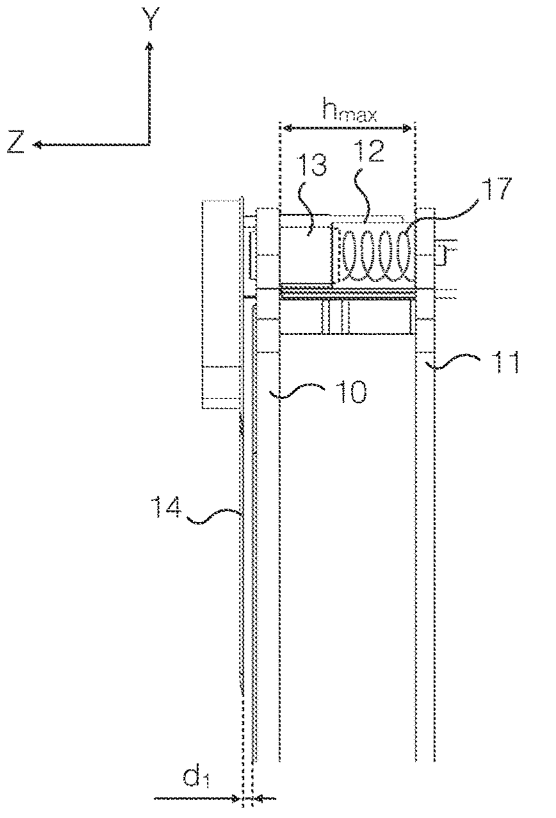
Figure 7B:
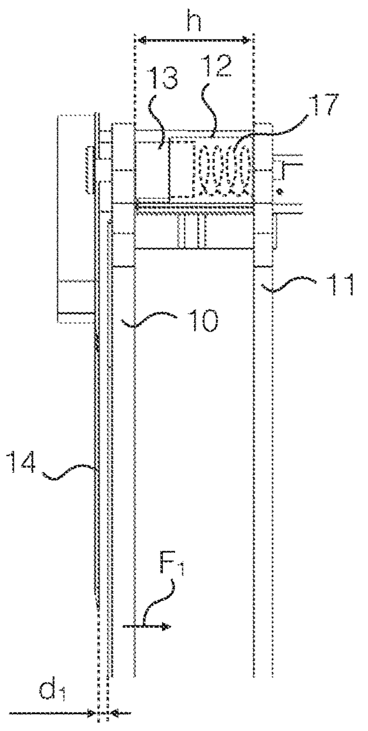
Figure 7C:
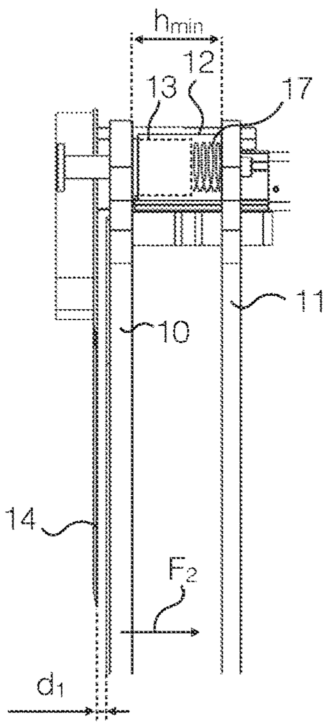

FIGS. 7*a*-7*c* schematically illustrate, in the case of the detacher of FIG. 2, the relative movement of a table and a base, as viewed from a side.

FIGS. 8*a*-8*d* schematically illustrate, according to an example, different distances between the blade and the table of a detacher, in conjunction with detaching different abrading products of different thicknesses, as viewed from a side.

Figure 9:
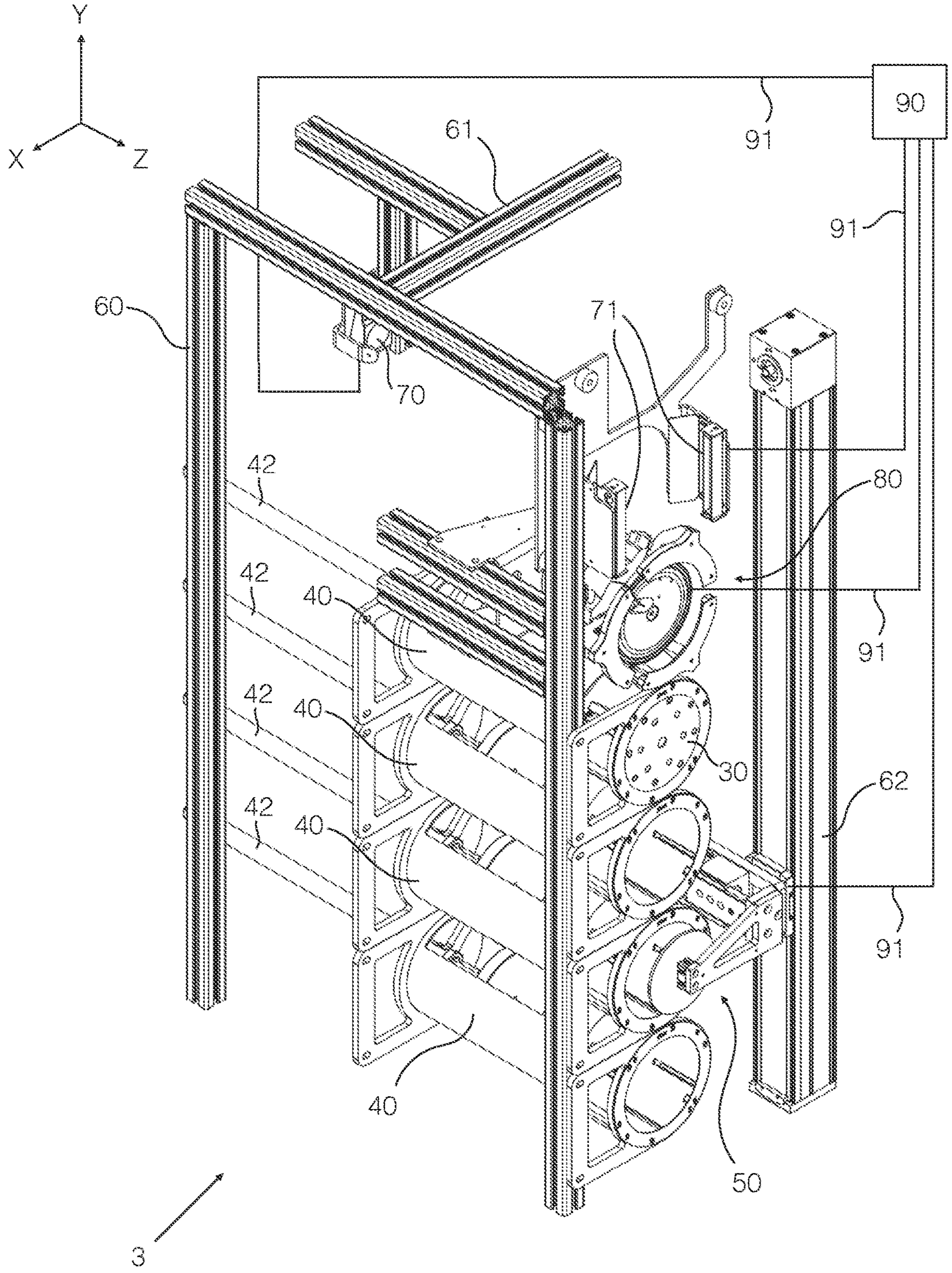

FIG. 9 schematically illustrates, according to an example, an abrading product attacher, as viewed diagonally from the front.

Figure 10:
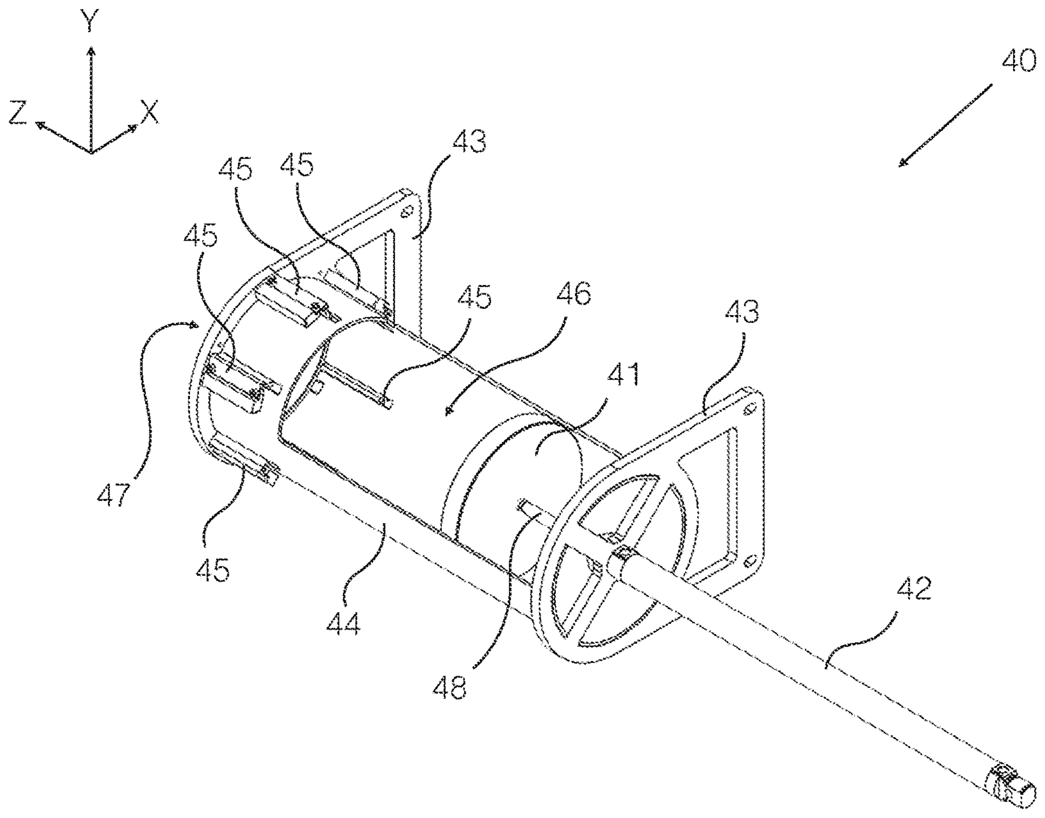

FIG. 10 schematically illustrates, according to an example, a magazine of an abrading product attacher, as viewed diagonally from behind.

Figure 11A:
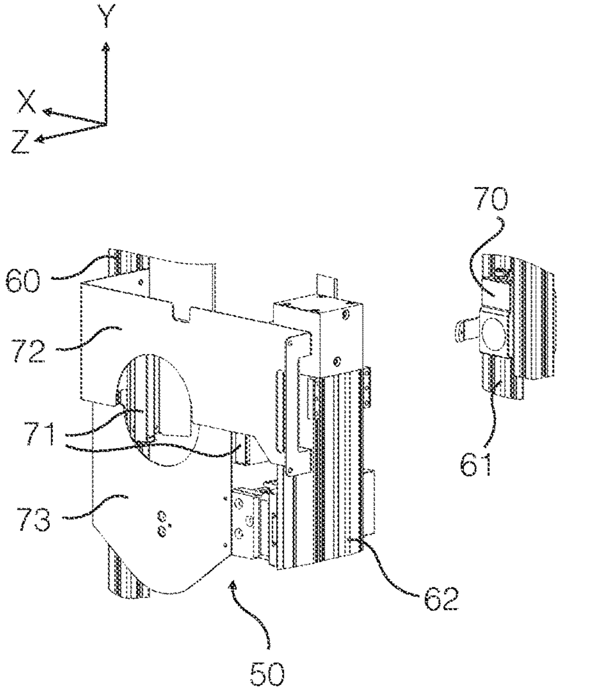

FIG. 11*a* schematically illustrates, according to an example, a camera and flash arrangement, together with a blinder arrangement, of an abrading product attacher, as viewed diagonally from the front.

Figure 11B:
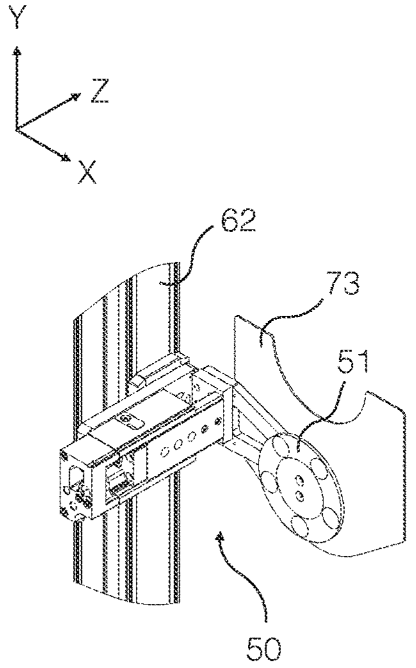

FIG. 11*b* schematically illustrates the lower blinder arrangement of FIG. 11*a* as attached to a gripping device, as viewed diagonally from behind.

Figure 12A:
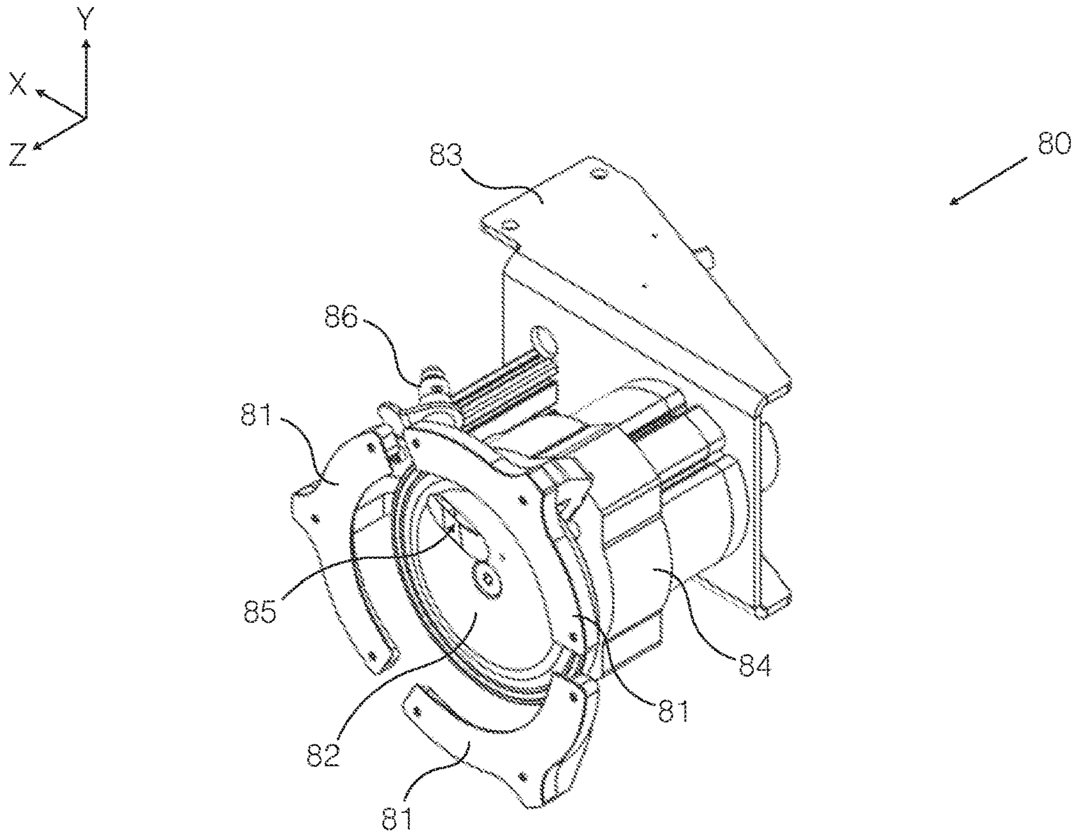
Figure 12B:
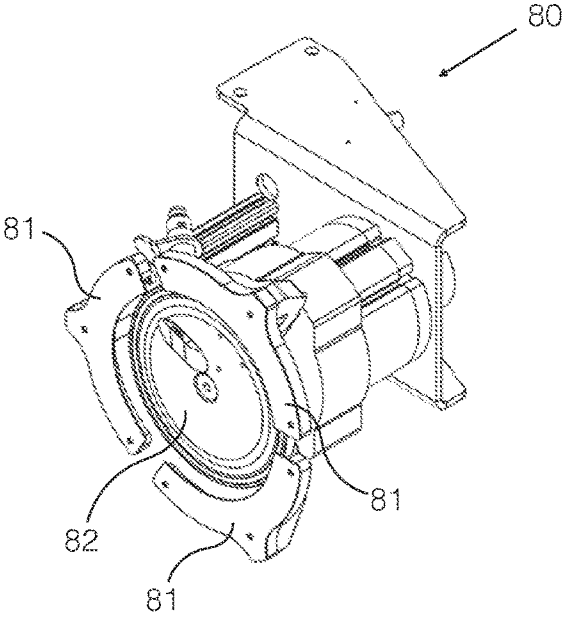
Figure 12C:
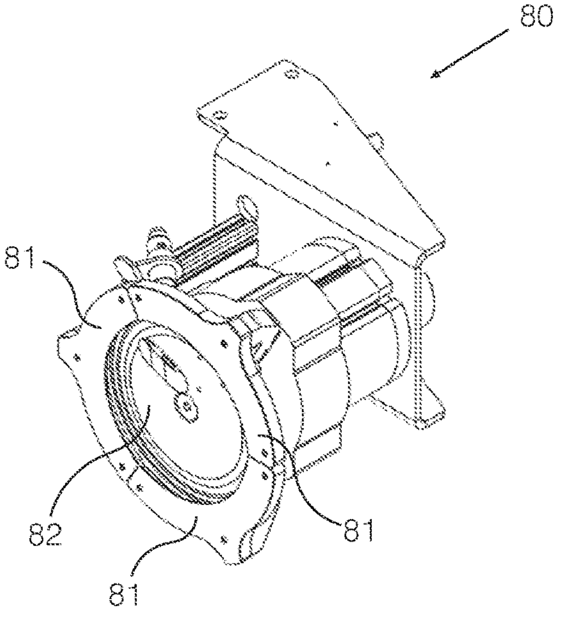

FIGS. 12*a*-12*c* schematically illustrate, according to an example, a loading device of an abrading product attacher in different operational states, and as viewed diagonally from the front.

Figure 13A:
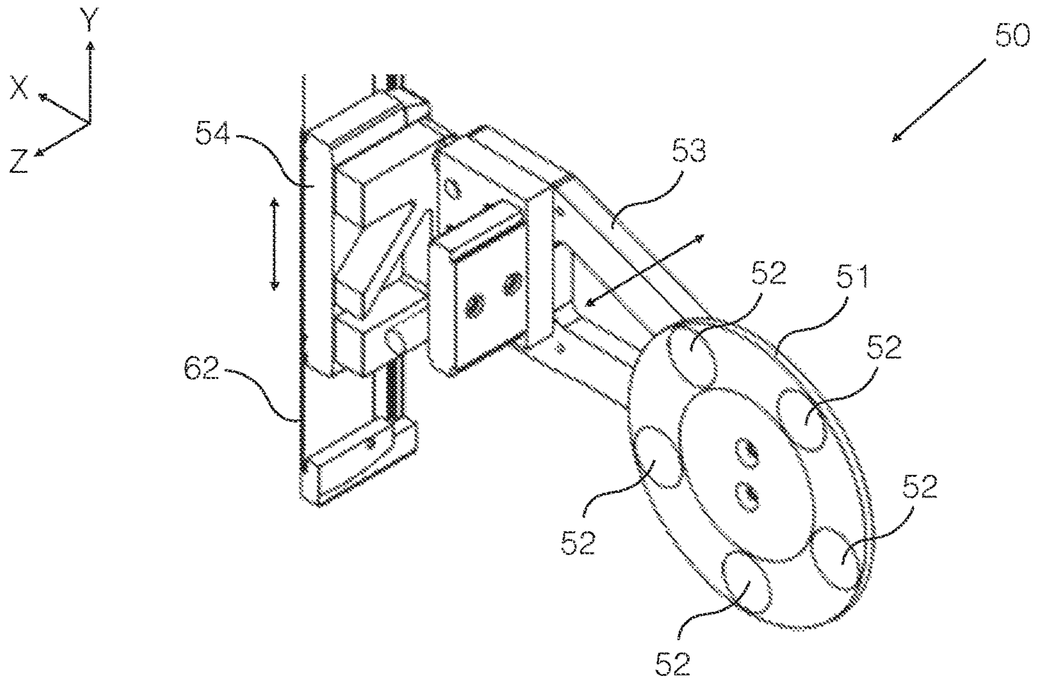
Figure 13B:
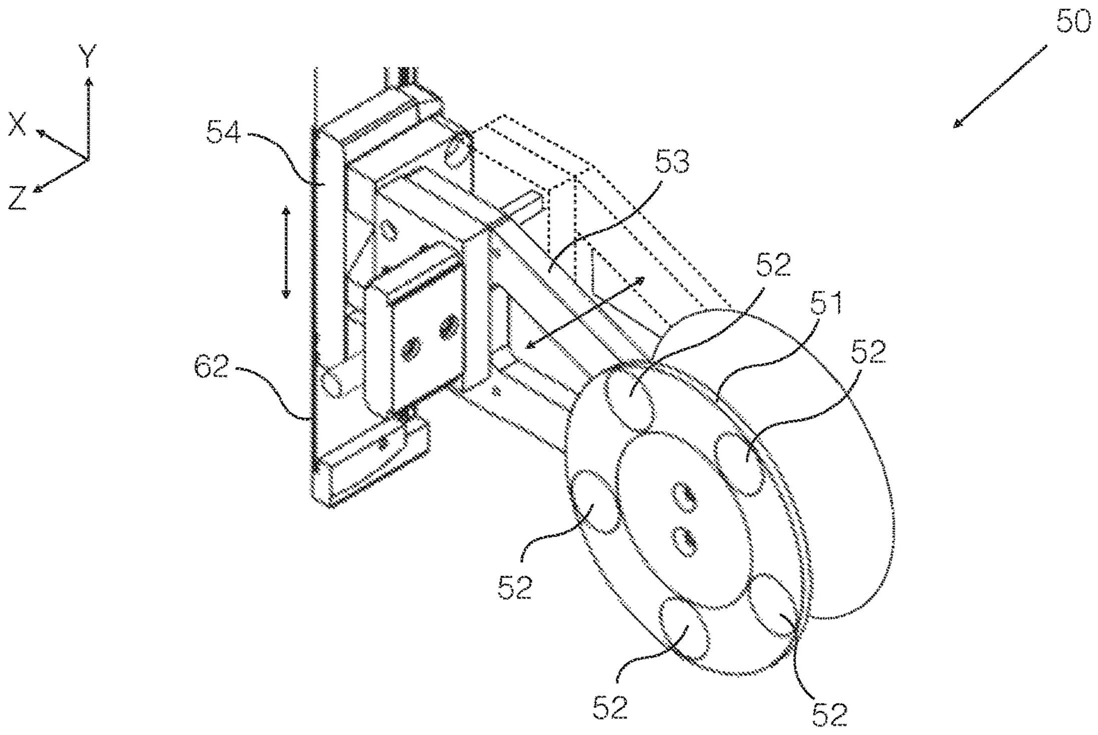

FIGS. 13*a*-13*b* schematically illustrate, according to an example, a gripping device of an abrading product attacher in different operational states, and as viewed diagonally from the behind.

FIGS. 14*a*-14*d* schematically illustrate, according to an example, the stepwise interaction between the gripping device of FIGS. 13*a*-13*b* and the magazine of FIG. 10 in the gripper picking up an abrading product from the magazine, as viewed diagonally from the front.

FIGS. 15*a*-15*d* schematically illustrate, according to an example, the stepwise interaction between the gripping device of FIGS. 13*a*-13*b* and the loading device of FIGS. 12*a*-12*c* in the gripper delivering an abrading product to the loading device, as viewed diagonally from the front.

FIGS. 16*a*-16*d* schematically illustrate, according to an example, the stepwise interaction between an abrading tool and the loading device of FIGS. 12*a*-12*c* in the abrading tool picking up an abrading product from the loading device, as viewed diagonally from the front, and with the possible device having the abrading tool omitted for illustrative clarity.

FIGS. 17*a*-17*h* schematically illustrate, according to an example, an operating cycle for the abrading product attacher of FIG. 9 in providing an abrading tool with an abrading product, as viewed diagonally from the front.

The figures are intended for illustrating the idea of the disclosed solution. Therefore, the figures are not in scale or suggestive of a definite layout of system components.

DETAILED DESCRIPTION OF THE INVENTION

Figure 8A:
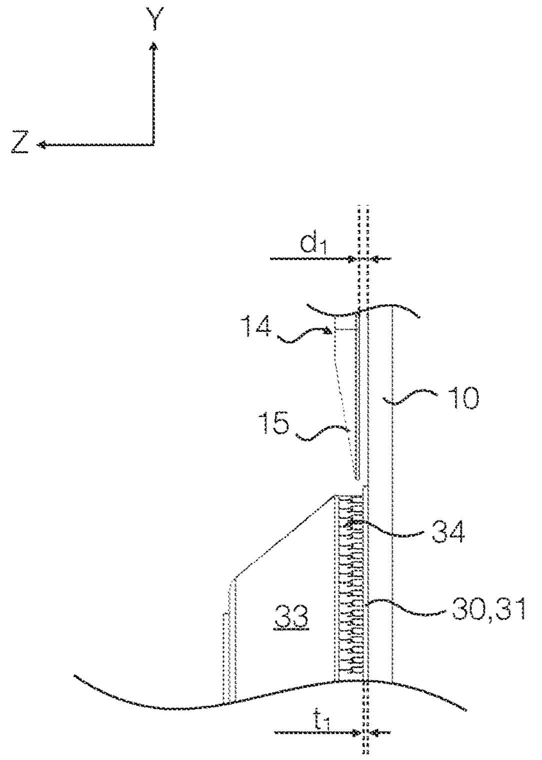
Figure 8B:
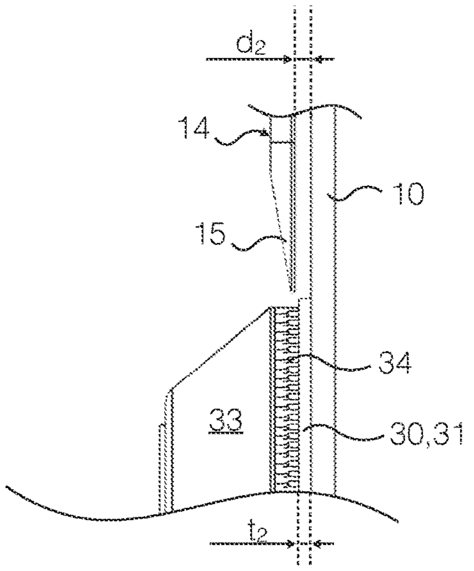
Figure 8C:
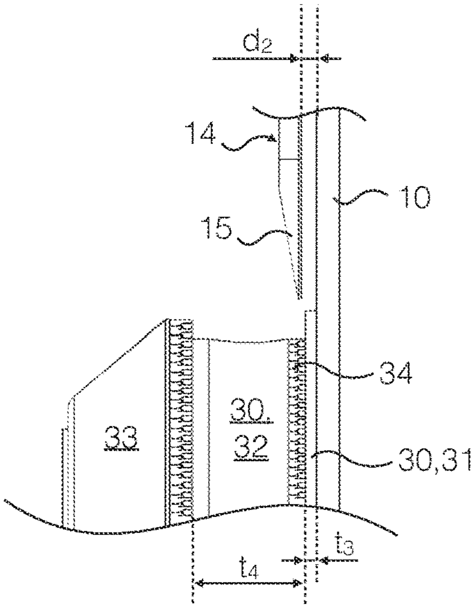
Figure 8D:
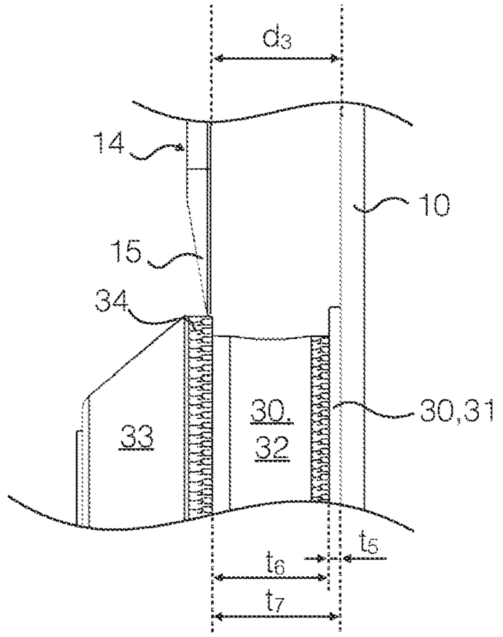

In the text, reference is made to the figures with the following numerals and denotations:

1 Device, for changing abrading products
2 Detacher
3 Attacher
4 Abrading tool
5 Robot
10 Table
11 Base
12 Outer column
13 Inner column
14 Blade
15 Tip, of blade
16 Motor
17 Spring
18 Shaft
19 Linear guide
20 Communications interface
21 Power supply socket
22 Bumper
30 Abrading product
31 Abrasive article
32 Interface pad
33 Backing pad
34 Gripping means
40 Magazine
41 Plunger
42 Linear actuator
43 Support, of magazine
44 Housing, of magazine
45 Movement-resisting element
46 Supply opening, of housing
47 Dispensing opening, of housing
48 Shaft
50 Gripping device
51 Gripping plate
52 Gripping element
53 Arm, of gripping device
54 First motion actuator
55 Second motion actuator
60 Frame
61 Auxiliary frame
62 Linear guide
70 Camera
71 Flash
72 Upper blinder
73 Lower blinder
80 Loading device
81 Collar element
82 Plunger
83 Support, of loading device
84 Housing, of loading device
85 Aperture
86 Sensor
90 Instructions-giving device
91 Communication pathway
d Distance, between blade and table
$d_1$, $d_2$, $d_3$ . . . Certain distances, between blade and table
$d_{max}$ Maximum distance, between blade and table
$d_{min}$ Minimum distance, between blade and table h Distance, between table and base $h_1$, $h_2$, $h_3$ . . . Distances, between table and base, each with certain magnitude $h_{max}$ Maximum distance, between table and base $h_{min}$ Minimum distance, between table and base t Thickness, of abrading product $t_1$, $t_2$, $t_3$ . . . Thicknesses, of abrading product, each with certain magnitude F Force $F_1$, $F_2$ Forces, each with certain magnitude X, Y, Z Orthogonal coordinates in the frame of a device for changing abrading products As a terminological note, the notion "abrading product" refers, through the text, to such products 30 which are consumed and therefore replaced during an abrading process. As typical examples, abrading products comprise abrasive articles 31 such as abrasive discs—perforated, non-perforated, abrading nets or the like—and interface pads 32 often used between backing pads 33 and abrasive articles 31. It is to be realized that different abrading products 30 are consumed at different rates and therefore require replacement at different rates. For example, an interface pad 32 may require replacement after ten abrasive articles 31 have been consumed as attached, one after another, to the interface pad 32. Moreover, in the context of detaching and/or attaching in the sense of the disclosed solution, an "abrading product" 30 may be an aggregate of individual abrading products 30, such as an aggregate of an abrasive article 31 and an interface pad 32 which may be detached and/or attached together as illustrated in FIG. 8*d* in the case of detaching. The functions of abrasive articles 31, interface pads 32 and backing pads are conventional and well known for a person skilled in the art, and therefore are not discussed here.

As another terminological note, throughout the text the notion of "front", and equivalent, refers to that side of the system elements which is towards the viewer along the Z axis in FIG. 1 when the system components are mounted in those positions as seen in FIG. 1. Correspondingly, the notion of "up", and equivalent, refers to the upward direction along the Y axis FIG. 1*a*.

FIG. 1*a* illustrates, according to an example, an abrading product exchange system 1 according to the disclosed solution.

The disclosed solution comprises an abrading product detacher 2—illustrated according to an example in FIG. 2—and an abrading product attacher 3—illustrated according to an example in FIG. 9.

Both the abrading product detacher 2 and the abrading product attacher 3 may be employed individually without one another in a device 1 for changing abrading products to enhance the efficiency of an abrading process, especially in robotized or otherwise automated abrading. Namely, the abrading product 30 detacher 2 enables efficient and non-manual detaching of abrading products 30 irrespective of their type or thickness t. Correspondingly, the abrading product 30 attacher 3 enables efficient and non-manual attaching of abrading products 30 of various types irrespective of their type or thickness t.

The abrading product detacher 2 and the abrading product attacher 3 may be employed together in a device 1 for changing abrading products to synergistically bring about even higher level of efficiency and capability to employ various types of abrading products 30 in abrading, especially in robotized or otherwise automated abrading. For example, and as will be elaborated below, employing the abrading product detacher 2 and the abrading product attacher 3 together in a device 1 for changing abrading products 30 enables fully unmanned robotized abrading in which various types of abrading products 30 are used and exchanged during abrading.

An abrading product detacher 2 according to the disclosed solution is illustrated in FIG. 2 according to an example.

The detacher 2 comprises, as main elements, a blade 14, a table 10 and a means such as a motor 16 to adjust the mutual distance d between the blade 14 and the table 10. Notably, and as is elaborated on below, such means 16 for adjusting the mutual distance d between the blade 14 and the table 10 are operable in the absence of the abrading product 30.

The table 10 is receiving into contact an abrading product 30, having a thickness t, as mounted to the gripping means 34 of an abrading tool 4.

The blade 14 is adapted to penetrate between the abrading product 30 to be detached and that element in or attached to an abrading tool 4 having the abrading product. That is, the blade 14 is adapted to penetrate into between the abrading product 30 to be detached and the gripping means 34 of abrading tool 4, as illustrated in FIGS. 8*a* to 8*c*. It is to be appreciated here and throughout the text that the notion of "gripping means" 34 of the abrading tool 4 refers to that element on or attached to an abrading tool 4 which is capable of gripping, i.e. holding, an abrading product 30. As a person skilled in the art understands, such gripping means 34 are to be compatible with the abrading product 30 used. For example, if an abrading product 30 has velcro-type loops on its attachment side, the gripping means are to comprise velcro-type hooks for gripping said loops. Another example, mutatis mutandis, is gripping based on pressure-sensitive adhesion, or PSA.

Moreover, as a person skilled in the art understands, the notion of "gripping means" 34 may refer to a backing pad 32 when an abrading product 30 is to be attached onto a backing pad 32 attached to an abrading tool 4, or it may refer to an interface pad 31 when an abrading product 30 is to be attached to an interface pad 31, which interface pad 31 may be attached to a backing pad 32 which, in turn, may be attached to an abrading tool 4. As a person skilled in the art is well aware of such issues, all conceivable combinations are not enumerated here exhaustively.

Thus, for example, the blade 14 may penetrate between an abrasive article 30 to be detached and an interface pad 31 or a backing pad 32 to which the abrasive article 30 is attached. Examples of such a situation are illustrated in FIGS. 8*a* to 8*c*. As another example, the blade 14 may penetrate between an interface pad 31 to be detached and a backing pad 32 to which the interface pad 31 is attached. An example of such a situation is illustrated in FIG. 8*d*.

Consistent with the above, if the gripping means 34 is premised on velcro-type hooks and loops, the blade 14 may penetrate into the hook and loop interface between the abrading product 30 to be detached and that element in or attached to an abrading tool 4 having the abrading product.

Figure 5A:
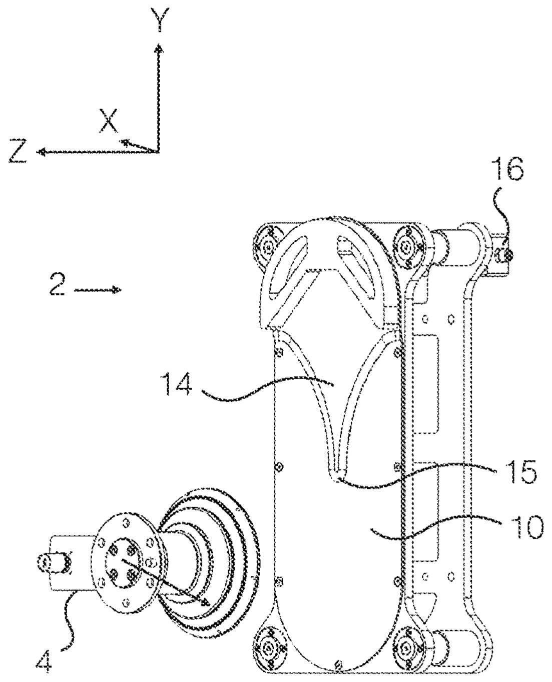
Figure 5B:
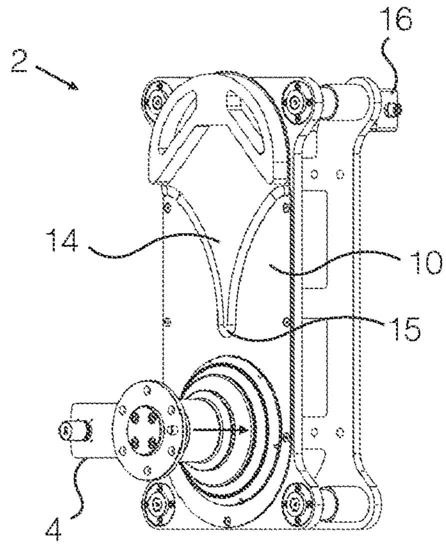
Figure 5C:
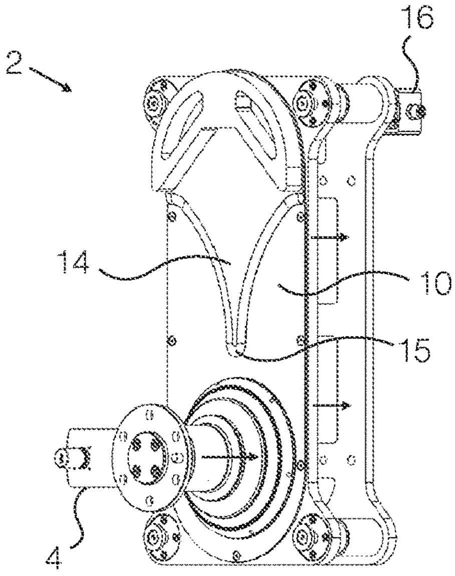
Figure 5D:
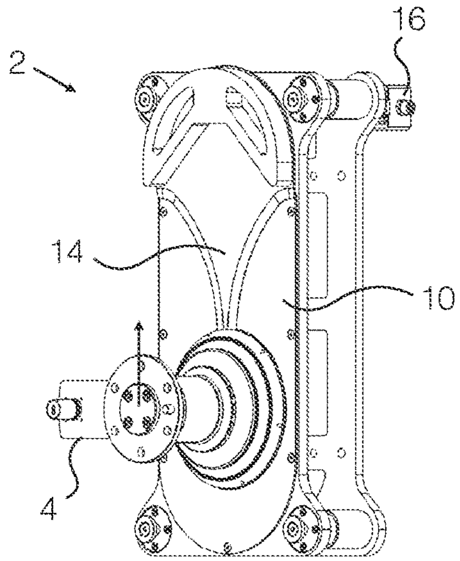
Figure 5E:
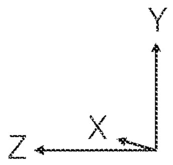
Figure 5E:
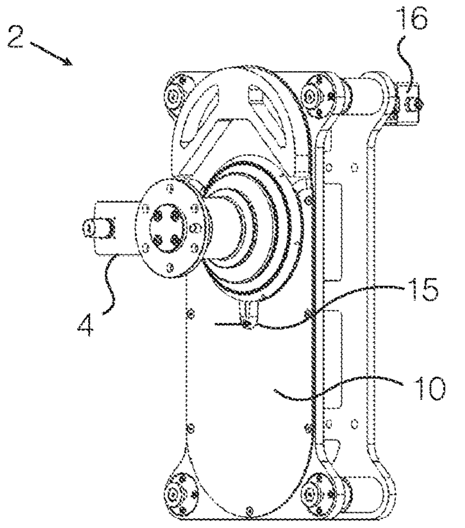
Figure 5F:
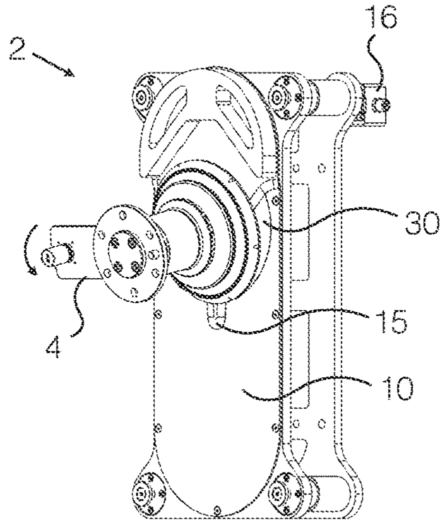

Advantageously, the blade 14 may comprise a narrow tip 15 such that the width of the tip 15 is smaller than the overall width of the blade 14, whereby the narrow tip 15 penetrates first between the abrading product 30 to be detached and that element in or attached to an abrading tool 4 having the abrading product 30, as illustrated according to an example in FIGS. 5*c* to 5*e*. Thusly configured, the narrow tip 15 improves the penetrability of the blade 14, thereby reducing the penetrating force required in detaching of an abrading product 30 and reducing penetration failures.

Referring to FIGS. 6*a* to 6*c*, according to the disclosed solution, the distance d between the blade 14 and the table 10 is adjustable with suitable means such as a motor 16. Thus, as illustrated in FIGS. 6*a* to 6*c*, the distance d may be adjusted, preferably steplessly, between a minimum distance $d_{min}$ and a maximum distance $d_{max}$. Such a minimum distance $d_{min}$ may be, for example, between 0 mm and 0.5 mm, such as 0.1 mm or 0.2 mm or 0.3 mm or 0.4 mm. Correspondingly, such a maximum distance $d_{max}$ may be, for example, between 15 mm and 35 mm, such as 20 mm or 25 mm or 30 mm.

The minimum distance $d_{min}$ is consequential if the blade 14 is configured to enable a pinching effect on the detached abrading product 30 as described below.

The maximum distance $d_{max}$ is consequential as it is one of the main determinants of the maximum thickness t of the abrading product 30 detachable with the detacher 2.

The adjustability of the distance d between the blade 14 and the table 10 has the beneficial technical effect of enabling the detacher 2 according to the disclosed solution to be employed to detach abrading products 30 of various different thicknesses t, as illustrated according to examples in FIGS. 8*a* to 8*d*. Furthermore, as will be elaborated on below, the distance d between the blade and the table 10 may beneficially be adjusted in the absence of an abrading product 30. Herein, it is to be appreciated that such thickness t of an abrading product 30 to be detached also applies to an aggregate thickness t of an aggregate abrading product 30 comprising two or more individual abrading products 30. Such an example is illustrated in FIG. 8*d* wherein the aggregate abrading product 30 to be detached comprises an abrasive article 31 with a thickness $t_5$ plus an interface pad 32 with a thickness $t_6$, whereby the thickness $t_7$ of the aggregate abrading product 30 is $t_5+t_6$.

Referring to FIGS. 6*a* to 6*c*, advantageously the distance d between the blade 14 and the table 10 may adjustable in such a manner that the blade 14 remains co-planar with the table 10, i.e. the distance d between the blade 14 and the table 10 remains the same or substantially the same over the entire surface area of the blade 14 regardless of the magnitude of the distance d. Doing so has the beneficial technical effect of keeping the penetrability of the blade 14 unaltered regardless of the thickness of the detached abrading product 30, as the penetration angle of the blade 14 does not vary as a function of—or as otherwise affected by—the thickness of the detached abrading product 30. Thus, doing so enables the detacher 2 to be employed with equal effectiveness and efficiency to detach abrading products 30 of greatly varying thicknesses from very thin abrasive articles 31 to very thick interface pads 32. As examples, a very thin abrasive article 31 may be approximately 0.4 mm in thickness whereas a very thick interface pad 32 may be approximately 20 mm in thickness.

Still referring to FIGS. 6*a* to 6*c*, advantageously the distance d between the blade 14 and the table 10 may adjustable in such a manner that adjusting the distance d between the blade 14 and the table 10 does not affect and/or is not affected by any other mechanical state of the detacher 2. For example, if the detacher 2 comprises a base 11 as elaborated on below, advantageously the distance d between the blade 14 and the table 10 does not affect and is not affected by the distance h of the table 10 and the base 11. By configuring the distance d between the blade 14 and the table 10 as not affecting and/or as being not affected by any other mechanical state of the detacher 2 has the beneficial effect of enabling the detacher 2 to perform additional functionalities while simultaneously maintaining the distance d between the blade 14 and the table 10 suitable for the thickness of the abrading product 30 to be detached or being detached.

Now referring to FIGS. 2 and 3, such adjusting of the distance d between the blade 14 and the table 10 may be brought about by a movement actuator such as a motor 16. In order to adjust the d between the blade 14 and the table 10 to accurately be suitable for a given abrading product 30 to be detached, the movement actuator such as the motor 16 is stepless, i.e. capable of steplessly adjusting the distance d between the blade 14 and the table 10.

Such a movement actuator may be connected to the blade 14 via a shaft 18. Such a shaft 18 may be movably coupled to, for example movably housed within, and travel relative to a linear guide 19, which linear guide 19 may be coupled with the table 10. As is apparent for a person skilled in the art, in such an implementation, the shaft 18 and the linear guide 19 may comprise means—for example a gear and rack arrangement—by which the motor 19 or equivalent actuator may effect movement of the shaft 18 relative to the linear guide 19, thereby effecting movement of the blade 14 relative to the table 10. Put differently, the means to adjust the mutual distance between the table 10 and the blade 10 may comprise—the linear guide 19 connected to the table 10, the shaft 18 connected to the blade 14 and movably coupled with the linear guide 19 and an actuator 16 such as a stepless electric motor adapted to move the shaft 18 relative to the linear guide 19.

Referring to FIG. 2, in the case the movement actuator takes the form of a motor 16, preferably a stepless motor 16, the motor 16 may comprise a power supply socket 21 for supply of electricity. In addition, such a motor 16 may comprise a communications interface 20 via which the motor 16 may be connected via a communication pathway 91 to an instructions-giving device 90 such as a programmable logic or equivalent, whereby the motor 16 may be instructed to adjust the distance d between the blade 14 and the table 10 for each upcoming abrading product 30 to be detached. With such a connection 91 to an instructions-giving device 90, the detacher 2 may advantageously adjust the distance d between the blade 14 and the table 10 already in anticipation, i.e. in the absence, of an abrading product 30 to be detached, while that abrading product 30 is, for example, still being used in an abrading process. Moreover, with such a connection 91 to an instructions-giving device 90, the detacher 2 may advantageously adjust the distance d between the blade 14 and the table 10 in anticipation of a next abrading product 30 to be detached in a sequence of anticipated abrading products 30 to be detached, which sequence may comprise abrading products 30 used by one or more abrading tools 4, such as a group of several industrial robots 5 each equipped with an abrading tool 4.

Now referring to FIG. 2, the detacher 2 may comprise a base 11. The base 11 may be connected to the table 10 by means of one or more column arrangements 12,13. For example, base 11 may be connected to the table 10 by means of one column arrangement 12,13 in each corner of the table 10, such that there is one column arrangement 12,13 in each one of the four corners of the table 10 as illustrated in the example depicted in FIG. 2.

The base 11 may be immovably attached in an immovable support structure in order to provide the detacher 2 with a rigid means of mounting. For example, the base 11 may be immovably attached to a frame 60, as illustrated in FIG. 1*a*, which frame 60 may be shared with other components of the device 1 for changing abrading products 30, such as with the attacher 3.

Now referring to FIG. 2 together with FIGS. 7*a* to 7*c*, the base 11 may be connected to the table 10 by means of one or more column arrangements 12,13 floatably, i.e. in such a manner that the table 10 may move towards and away from the base 11, i.e. along the Z axis in FIG. 2. Put otherwise, the base 11 may be connected to the table 10 by means of one or more column arrangements 12,13 adapted to enable varying distance h between the base 11 and the table 12. Such a configuration has the beneficial technical effect to permitting variability in the positioning of the abrading tool 4 having the abrading product 30 to be detached when coming into contact with the table 10 upon embarking on detaching the abrading product 30. Thus, by configuring the base 11 to be connected to the table 10 by means of column arrangements 12,13 adapted to enable varying distance h between the base 11 and the table 12 increases the robustness of the detacher 2 in not requiring very finely positioned abrading product 30 in relation to the table 10. Doing so enables, for example, an abrading robot 5 equipped with the abrading tool 4 having the abrading product 30 to move with a fast and relatively inaccurate movement to bring the abrading product 30 into contact with the table 10 without having to slow down in order to have the abrading product 30 highly accurately positioned with respect to the table 10.

To enable such robustness as just described, the base 11 may be connected to the table 10 by means of column arrangements 12,13 each comprising an inner column 13 which may move inside and in relation to a hollow outer column 12, as illustrated in FIG. 2 and FIGS. 7*a* to 7*c*. Put differently, with such an arrangement, the inner column 13 may be movably coupled with the outer column 12 and be capable of penetrating to inside the outer column 12. Furthermore, such an arrangement may advantageously be furnished with a spring 17 inside each outer column 12 resisting the penetrating movement of the respective inner column 13 to inside the outer column 12. Thusly furnished, the spring 17 compresses when force F is applied against the table 10—as a notable example, by an abrading tool 4 having an abrading product 30 to be detached—whereby the table 10 moves closer to the base 11, whereby the inner column 13 moves further inside the outer column 12 consequently compressing the spring 17. Put differently, the spring(s) 17 may absorb an impact exerted by the abrading product 30 onto the table 10. Correspondingly, when the above-mentioned force F is released, the table 10 returns to its original position with respect to—such as to its maximum distance $h_{max}$ from—the base 11 as pushed by the spring 17 in each of the column arrangement 12,13.

Such a spring-based implementation for the column arrangements 12,13 has the beneficial technical effect to permitting variability in the positioning of the abrading tool 4 having the abrading product 30 to be detached when coming into contact with the table 10 upon embarking on detaching the abrading product 30, as the spring(s) 17 may absorb any impact exerted by the abrading tool 4 onto the table 10. Thus, by configuring the base 11 to be connected to the table 10 by means of spring-comprising column arrangements 12,13 adapted to enable varying distance h between the base 11 and the table 12 increases the robustness of the detacher 2 in not requiring very finely positioned abrading product 30 in relation to the table 10 as the spring(s) 17 may absorb an impact exerted by the abrading tool 4 onto the table 10. By doing so enables, for example, an abrading robot equipped with the abrading tool 4 having the abrading product 30 to move with a fast and relatively inaccurate movement to bring the abrading product 30 into contact with the table 10 without having to slow down in order to avoid a potentially damaging impact onto the table 10.

The column arrangement 12,13 comprising one or more sets of inner columns 12 and outer columns 13 as described above has the beneficial technical effect of guiding the movement of the table 10 in relation to the base 11 so that the table 10 does not tilt in relation to the base 11. Thereby, the orientation angle of the blade 14 remains constant or substantially constant while the blade 14 may move together with the table 10 in relation to the base 11. Put otherwise, thereby the base 11 remains co-planar with the table 10 regardless of their mutual distance h.

Consistently with what was described already earlier, advantageously any alterations in the distance h between the table 10 and the base 11 have no effect on the distance d between the blade 14 and the table 10.

FIGS. 5*a* to 5*h* illustrate, according to an example, stepwise progression of detaching an abrading product 30 with the detacher 2. Such progression also constitutes a method for detaching an abrading product 30 according to the disclosed solution.

With reference to FIG. 5*a*, an abrading tool 4—which may be attached to an abrading robot 5 or an equivalent device—first approaches the detacher 2. Such approaching may be performed with a rapid and relatively inaccurate movement of the abrading tool 4.

With reference to FIG. 5*b*, the abrading tool 4 next moves into contact with the table 10 of the detacher 2. In this context, it is to be understood that while for straightforwardness of description it is said that the abrading tool 4 comes into contact with the table 10, precisely speaking it is the abrading product 30 attached lowermost to the abrading tool 4 that comes into contact with the table 10, as a person skilled in the art readily understands. Such coming into contact may be performed with a rapid and relatively inaccurate movement of the abrading tool 4 in case the table 10 is in a spring-mediated contact with the base 10, as described earlier, in which case the table 10 may absorb a reasonable impact by the abrading tool 4 onto the table 10, as illustrated in FIG. 5*c* with the movement of the table 10 towards the base 11. As a person skilled in the art understands, after having come into contact with the table 10, the abrading product 30 to be detached is to reside on the table 10 at least substantially co-planarly with the table 10.

With reference to FIG. 5*d*, the abrading tool 4 next moves, while being in contact with the table 10, towards the blade 14, whereby eventually the blade 14 starts to penetrate into the gripping interface between the abrading product 30 to be detached and that element attached to the abrading tool 4 to which the abrading product 30 to be detached is attached. In case the blade 14 comprises a narrow tip 15 or several such tips 15, such tip(s) 15 penetrates first, followed by an increasing cross-section of the blade 14.

With reference to FIG. 5*e*, the abrading tool 4 continues motion on the same or substantially same trajectory, preferably until some portion of the blade 14, such as the tip(s) 15 of the blade 14 re-emerges from between the abrading product 30 to be detached and that element attached to the abrading tool 4 to which the abrading product 30 to be detached is attached. In other words, and for reasons described below, it is not necessary that the penetrating travel of the blade 14 would result in complete separation of the abrading product 30 to be detached from that element attached to the abrading tool 4 to which the abrading product 30 to be detached is/was attached. Nor is it necessary that the blade 14 would, at any one time, fully occupy the space between the abrading product 30 (to be) detached and that element attached to the abrading tool 4 to which the abrading product 30 to be detached is/was attached.

Figure 5G:
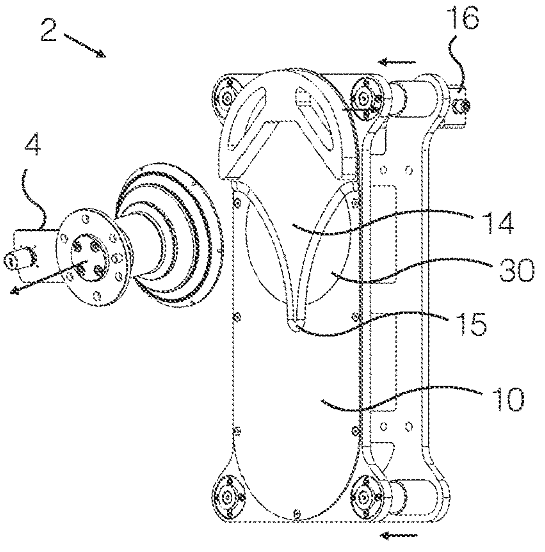

With reference to FIGS. 5*e* and 5*g*, the abrading tool 4 next makes a retracting movement whereby the abrading product 30 becomes detached from that element attached to the abrading tool 4 to which the abrading product 30 to be detached was attached. Advantageously, to facilitate such detachment, the retracting movement of the abrading tool 4 may be divided into two sub-movements such as a first tilting movement illustrated in FIG. 5*f* and a subsequent withdrawing movement as illustrated in FIG. 5*g*. Such sub-movements have the beneficial technical effect of reducing the required detachment force because the abrading product 30 is gradually detached from that element attached to the abrading tool 4 to which the abrading product 30 to be detached is attached.

The ejection of the detached abrading product 30 from the detacher 2 is facilitated if the detacher 2 is installed in a vertical or nearly vertical orientation such that the table 10 is vertically or nearly vertically oriented. Thereby, the abrading product 30 may be ejected from the detacher 2 as pulled by the gravity, i.e. without any need for additional ejection apparatus(es) and/or manual labor.

Figure 5H:
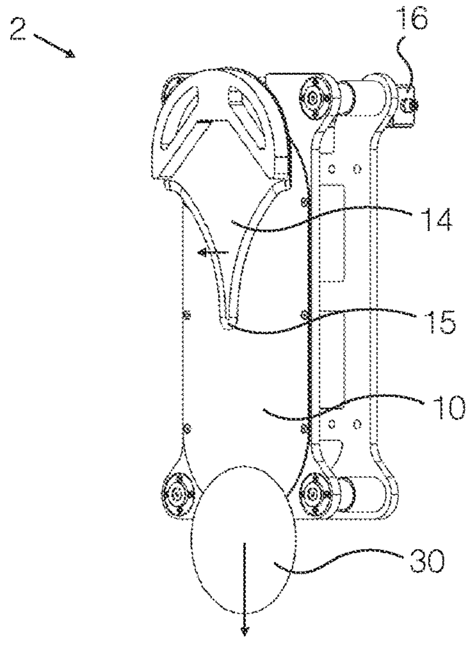

The ejection of the detached abrading product 30 may be made more controlled by having the blade 14 pinch the abrading product 30 to be detached. This may be brought about, for example, by moving the blade 14 closer to the table 10 upon, or shortly after, a portion of the blade 14 re-emerging from between the abrading product 30 to be detached and that element attached to the abrading tool 4 to which the abrading product 30 to be detached is attached. By thusly moving the blade 14 closer to the table 10 causes the blade 14 to press the abrading product 30 against the table 10, thereby pinching the abrading product 30 in place. Afterwards, when the abrading tool 4 has withdrawn from contact with the table 10, such pinching may be released, as illustrated in FIG. 5*h*, by increasing the distance d between the blade 14 and the table 10, whereby the abrading product may be controllably released for ejection at a desired point of time.

Such pinching of the abrading product 30 by the blade 14 has the additional benefit of holding the abrading product 30 in place during the retracting movement of the abrading tool 4 whereby the abrading product 30 may be prevented from slipping in case the detachment of the abrading product 40 occurs asymmetrically.

After the abrading product 30 has been expelled from the detacher 2, controllably by pinching functionality or otherwise, the abrading product 30 may be collected in a receptacle or conveyed elsewhere, for example with a conveyer belt. Thus, in case the detacher 2 is mounted vertically, like is illustrated in FIG. 1*a*, the detached abrading products 30 do not accumulate inside or within the detacher 2, whereby the operation of the detacher 2 beneficially need not be periodically interrupted in order to empty the detacher 2 from accumulated detached abrading products 30.

The detacher 2 may additionally comprise a bumper 22 as illustrated in FIG. 2. Such a bumper 22 is mounted to that end of the blade 14 which is opposite to the first-penetrating part of the blade 14 such as the tip 15. The bumper 22 serves as an ultimate stopper in the penetrating movement of the abrading tool 4 in accordance with the above when that element of the abrading tool 4 having the abrading product 30 is pressed against the bumper 22.

Advantageously, the bumper 22 comprises a V-shaped section, as illustrated in FIG. 2, whereby the element of the abrading tool 4 having the abrading product 30 is forced—as the V-shape closes in—into a specific position along the X axis as it is pressed against the bumper 22. In the case of random orbital abrading tools 4—in which the internal axis of rotation of the abrading tool 4 is offset from the center of the element of the abrading tool 4 having the abrading product 30 such as a backing pad 33—the internal axis of rotation of the abrading tool 4 may be forced to rotate into a known position. For example, by pressing the element of the abrading tool 4 having the abrading product 30 against the V-shaped section of the bumper 22 may force the internal axis of the abrading tool 4 to rotate into such a position that the axially offset mounting point of the element of the abrading tool 4 having the abrading product 30 is at a maximum distance from the bumper 22. This has the beneficial technical effect of enabling aligning the internal axis of the abrading tool 4 and thereby the axially offset mounting point of the element of the abrading tool 4 having the abrading product 30 into a known locus in the X-Y plane—for example in view of subsequently attaching an abrading product 30 automatically such as with an attacher 3 as described below—even without machine vision capabilities or other such more complicated arrangements. For example, such alignment may be sufficient for precise subsequent attaching of a non-perforated abrading product 30 such as an abrading net-based abrasive article 31 where the rotational position of the element of the abrading tool 4 receiving the abrading product 30 is inconsequential.

An attacher 3 according to the disclosed solution is illustrated according to an example in FIG. 9.

The attacher 3 comprises as main elements, one or more magazines 40, a movable gripping device 50 and a loading device 80. Such main elements as well as any additional elements may be mounted on a frame 60, though the movable gripping device 50 may be mounted on a separate support structure more amenable for providing the required movement—as elaborated on below—such as a linear guide 62.

Of the main elements, the one or magazines 40 are adapted to receive and store a plurality of abrading products 30. Correspondingly, the loading device 80 is adapted to receive and hold an abrading product 30 for attachment to an abrading tool 4. Furthermore, the gripping device 50 comprises gripping means 52 and is adapted to grip an abrading product 30 at the one or more magazines 40, move from said one or more magazines 40 to the loading device 80 and deposit the abrading product 30 at the loading device 80.

As additional possibilities, the attacher 3 may comprise means for providing machine vision capabilities such as a camera 70. To enhance machine vision capabilities, the camera 70 may be accompanied with one or more flashes 71 for improved illumination.

The magazine 40, of which there may be one or more in the attacher 3, is illustrated according to an example in FIG. 10. The magazine 40 is adapted to receive and thereafter house a plurality of abrading products 30 to be attached, such as a plurality of abrasive articles 31 and/or a plurality of interface pads 32. For straightforwardness of operation, it may be advantageous to stock one magazine 40 with one type of abrading products 30.

In principle, there is no upper limit to the number of magazines 40 in the attacher 3 according to the disclosed solution. Rather, the practical upper limit to the number magazines 40 derives from the desired physical dimensions of the attacher 3 and/or the setup times and speed of operation.

Still referring to FIG. 10, the magazine 40 comprises as main elements a housing 44, a plunger 41 and supports 43 for mounting the magazine to a support structure such as the frame 60.

The housing 44 of the magazine 40 is elongated in order to allow a plurality of abrading products 30 to be housed within the housing.

Advantageously, the housing 44 has an internal cross-sectional shape and area which matches of substantially matches the cross-sectional shape and area of the abrading products 30 to be housed within the housing. For example, and as illustrated in the example depicted in FIG. 10, in the case of circular abrading products 30 such as abrasive discs 31, the housing 44 is cylindrical. Thus, an attacher 3 may comprise magazines 40 with mutually different internal cross-sectional sizes and/or shapes to accommodate abrading products 30 with mutually different cross-sectional sizes and/or shapes. For circular abrading products 30, for example, an attacher 30 may comprise magazines 40 with approximately 1-inch, 3-inch, 5-inch, 6-inch and/or 9-inch circular internal cross-sectional areas. The same dimensioning principles apply to a loading device 80 of the attacher 3—as described further below—especially with respect to the plunger 82 and the collar elements 81 of the loading device 80.

Furthermore, the housing 44 comprises a supply opening 46 configured to allow abrading products 30 to be inserted, i.e. supplied, into the housing 44. Preferably, the supply opening 46 is dimensioned large enough to allow abrading products 30 to be installed in stacks of plurality of abrading products 30, such as in stacks of 5, 10, 50 or 100 abrading products 30.

Correspondingly, the housing 44 comprises a dispensing opening 47 configured to allow abrading products 30 to be attached to travel through, being thereby dispensed from the magazine 40. Preferably, the dispensing opening 47 is at that side of the magazine 40 which faces—as is elaborated below and illustrated in FIG. 9—a gripping device 50 when the gripping device 50 is at the magazine 40.

Referring to FIG. 10, the magazine 40 comprises a plunger 41. The plunger 41 is movably mounted in the housing 44, at that end of the housing 44 which is opposite to the dispensing opening 47. The plunger 41 is connected to and moved by a shaft 48 or an equivalent means of providing the plunger 41 with movement. The plunger 41 is thereby configured to provide the abrading product(s) 30 housed within the housing with pushing force towards the dispensing opening 47. In case the plunger 41 is provided with movement with a shaft 48, the shaft 48 may actuated with a linear actuator 42 such as a pneumatic cylinder.

Still referring to FIG. 10, the magazine 40 advantageously comprises one or more movement-resisting elements 45 adapted to resist the movement of the abrading product(s) 30 housed within the magazine 40. Such movement-resisting element(s) 45 may be mounted on the inside wall, i.e. on the inner surface, of the housing 44 at and/or near the dispensing opening 47 in order to prevent inadvertent exit of the abrading product(s) 30 through the dispensing opening 47 as one of its/their function. That is, the movement-resisting elements 45 are adapted for resisting the movement of the abrading product(s) 30 in the magazine 40 relative to the dispensing opening 47.

For example, and as illustrated in the example depicted in FIG. 10, such movement-resisting element(s) 45 may take the form of bristle unit(s). Such bristle unit(s), as movement-resisting element(s) 45, comprise set of bristles directed towards the inside of housing 44. For example, there may be four, six or eight bristle units mounted on the housing 44 such that their bristles are directed towards the inside of the housing 44. Such bristle units, as movement-resisting elements 45, may be elongated and extend along the length of the housing 44 from the dispensing opening 47 towards the plunger 41, for example to a distance of 1 cm, 5 cm or 10 cm from the dispensing opening 47.

Such movement-resisting elements 45 housed within the magazine 40, such as the bristle units, have the beneficial technical effect of preventing the inadvertent exit of abrading product(s) 30 from the magazine 40. Thus, regardless of the mounting direction of the magazine 40, the abrading product(s) 30 may be prevented from exiting the magazine 40 before specifically picked up as elaborated on below. Thus, it is not necessary to mount the magazine 40 vertically with the dispensing opening 47 directing upwards in order to have the abrading product(s) controllably dispensed, but the magazine 40 may be mounted, for example, horizontally—i.e. along the Z axis—as illustrated in FIG. 9 according to an example.

Such movement-resisting elements 45, when implemented as bristle units, have the additional beneficial technical effect of separating the abrading products 30 dispensed from the magazine 40 as elaborated on below. Therefore, the magazine 40 enables controlled individual dispensing of abrading products 30 to be attached, even in the case of abrading products 30 which typically become attached to each other when stacked, such as abrasive net discs. Thus, it is not necessary to separate such abrading products 30 which easily become attached to each other with papers, foils, aluminum sheets or equivalent, but rather such abrading products 30 may be stacked into the magazine 40 as-is for controlled individual dispensing.

It is conceivable that the above-described functionality of separating the abrading products 30 from each other may be implemented also otherwise, for example as a functionality separate from the movement-resisting elements 45. For example, such a functionality of separating the abrading products may be implemented by injecting pressurized air in between the abrading products 30 to be separated from each other.

Now referring to FIGS. 13*a* and 13*b*, the gripping device 50 of the attacher 3 is adapted to transport abrading products 30 within the attacher 3. As a notable example, the attacher 3 is adapted to transport abrading products 30 from the one or more magazines 40 to a loading device 80 as elaborated on below. As another example, if the attacher 3 is equipped with means for providing capabilities for machine vision, the gripping device 50 is adapted to transport abrading products 30 to and from those means as well.

Now referring to FIG. 9, the gripping device 50 is coupled with a structure which provides the gripping device 50 with means to travel between the main elements of the attacher 3, at least between the one or more magazines 40 and the loading device 80. Towards that end, and as is illustrated in the example depicted in FIG. 9, the attacher 3 may comprise a linear guide 62 with which the gripping device 50 may be coupled and along which the gripping device 50 may travel. In such a case, the one or more magazines 40 and the loading device 80 are to be installed—for example stacked in a vertical row co-linear with the linear guide 62—in such a manner that the gripping device 50 can reach the one or more magazines 40 and the loading device 80 while travelling along the linear guide 62 as elaborated on below.

Now referring to FIGS. 13*a* and 13*b*, if coupled with a linear guide 62, and as a person skilled in the art readily understands, the gripping device 50 is to be provided with a first motion actuator 54 which can interact with the linear guide 62 so as to provide the gripping device 50 movement along the linear guide 62. For example, such interaction may be premised on a gear and rack arrangement driven by an actuator such as an electric or pneumatic motor. Thus, the first motion actuator 54 may be movably coupled with a linear guide 62 for effecting movement of the gripping device 50 at least between the one or more magazines 40 and the loading device 80.

As an alternative to employing a linear guide 62, it is conceivable that the gripper 50 may be mounted on a robot (not illustrated) or an equivalent arm arrangement (not illustrated). In such a case, the one or more magazines 40 and the loading device 80 and any other element of the attacher 3 with which the gripper 50 may interact, such as means for machine vision capabilities, may be situated with more freedom as long as they reside within the operating range of the robot or an equivalent arm arrangement.

In order to transport abrading products 30 within the attacher 3, the gripping device 50 comprises means for gripping abrading products 30. As a person skilled in the art readily understands, such means of gripping are to be compatible with the corresponding gripping surfaces of the abrading products 30 to be gripped. For example, if the abrading products 30 to be gripped comprise hook-and-loop—or, velcro—type of gripping surfaces, the means of gripping of the gripping device 50 are also to be premised on hook-and-loop—or, velcro—type of gripping surfaces.

It is conceivable that instead of—or even as an addition to—hook-and-loop type of gripping means in the gripping device 50, such gripping means may be premised on needles—i.e. needles piercing through the abrading product 30 thereby gripping it via needles—or premised on vacuum—i.e. suction pressure being subjected onto a non-perforated surface of the abrading product 30. Such needle- and vacuum-premised solutions could offer the benefit of less prone to wear in use.

Referring to FIGS. 13*a* and 13*b*, for the purposes of gripping abrading products 30, the gripping device 50 may be provided with a gripping plate 51 comprising the above-mentioned means of gripping such as one or more gripping elements 52. Advantageously, such a gripping plate 51 is substantially of the same shape as the abrading products 30 to be gripped. For example, if the abrading products 30 to be gripped are circular, the gripping plate 51 may be correspondingly circular. For the reasons of interaction with the loading device 80 described further below, the gripping plate 51 is to be smaller in surface area than the abrading products 30 to be gripped.

Referring to FIGS. 13*a* and 13*b*, if the gripping device 50 is coupled with a linear guide 62, the gripping plate 51 is also configured to be capable of travelling towards and away from the elements of the attacher 3 with which the gripping device 50 interacts, such as the one or more magazines 40 and the loading device 80. In the example illustrated in FIG. 9, such travel is horizontal whereas the travel along the linear guide 62 is vertical. For providing the gripping plate 51 with a capability to travel towards and away from the elements of the attacher 3, the gripping device 50 comprises a second motion actuator 55 shown according to an example in FIGS. 14*a* to 14*d* and 15*a* to 15*d*. As a person skilled in the art readily understands, such a second motion actuator 55 may be premised on a gear and rack arrangement driven by an actuator such as an electric or pneumatic motor. Thus, second motion actuator 55 may be adapted to move the gripping means 52, such as the one or more gripping elements 52, towards and away from at least the one or more magazines 40 and the loading device 80.

In order to provide desired distance between the second motion actuator 55 and the abrading plate 51, the abrading plate 51 may be connected to the second motion actuator 55 via an arm 53, as illustrated according to an example in FIGS. 13*a* and 13*b*.

With reference to FIGS. 14*a* to 14*d*, the gripping device 50 may interact with the magazine 40 as follows. The following principles also apply in the case of each of the magazines 40 in an attacher 3 comprising more than one magazine 40.

Figure 14A:
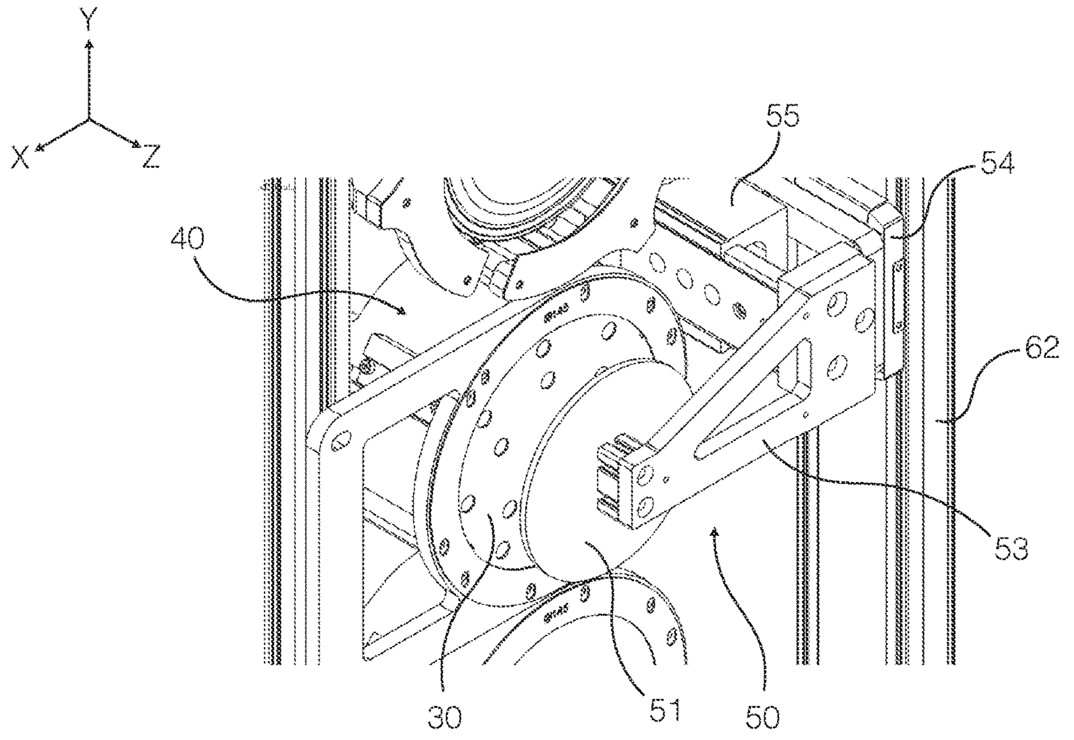

With reference to FIG. 14*a*, the gripping device 50 moves, for example along the linear guide 62, to a position at the magazine 40 housing one or more abrading products 30.

Figure 14B:
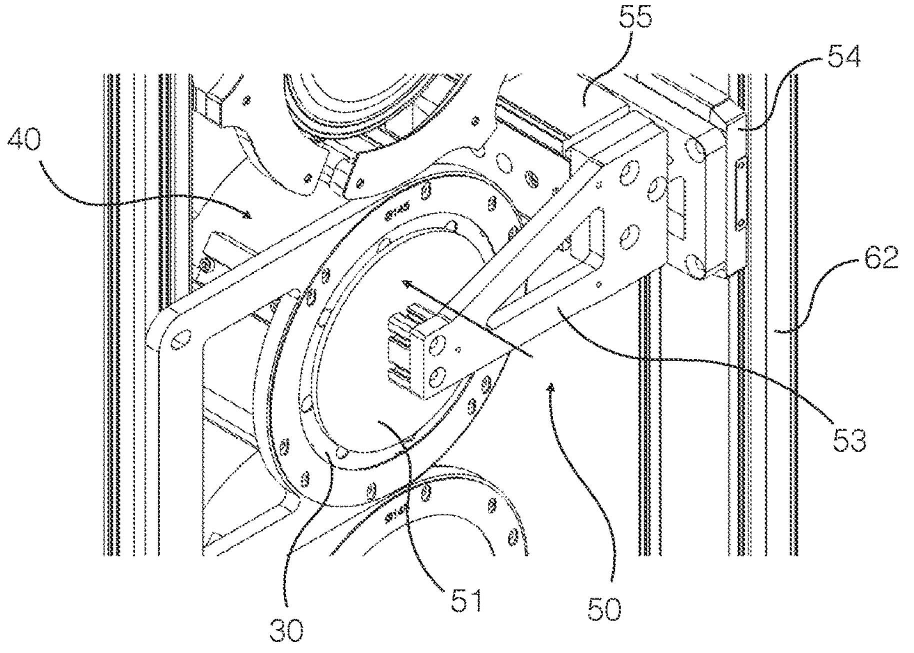

Next, with reference to FIG. 14*b*, the gripping device 50 moves, as effected by the second motion actuator 55, the gripping plate 51 into contact with the foremost abrading product 30 in the magazine 40. As is obvious, the abrading product(s) 30 in the magazine are to be housed so as to have their gripping surfaces towards the dispensing opening 47 so as to expose their gripping surfaces towards the abrading plate 51 upon becoming the foremost at the dispensing opening 47. Upon coming into contact with the foremost abrading product 30, the gripping elements 52 of the gripping plate grip onto the gripping surface of the foremost abrading product 30.

Figure 14C:
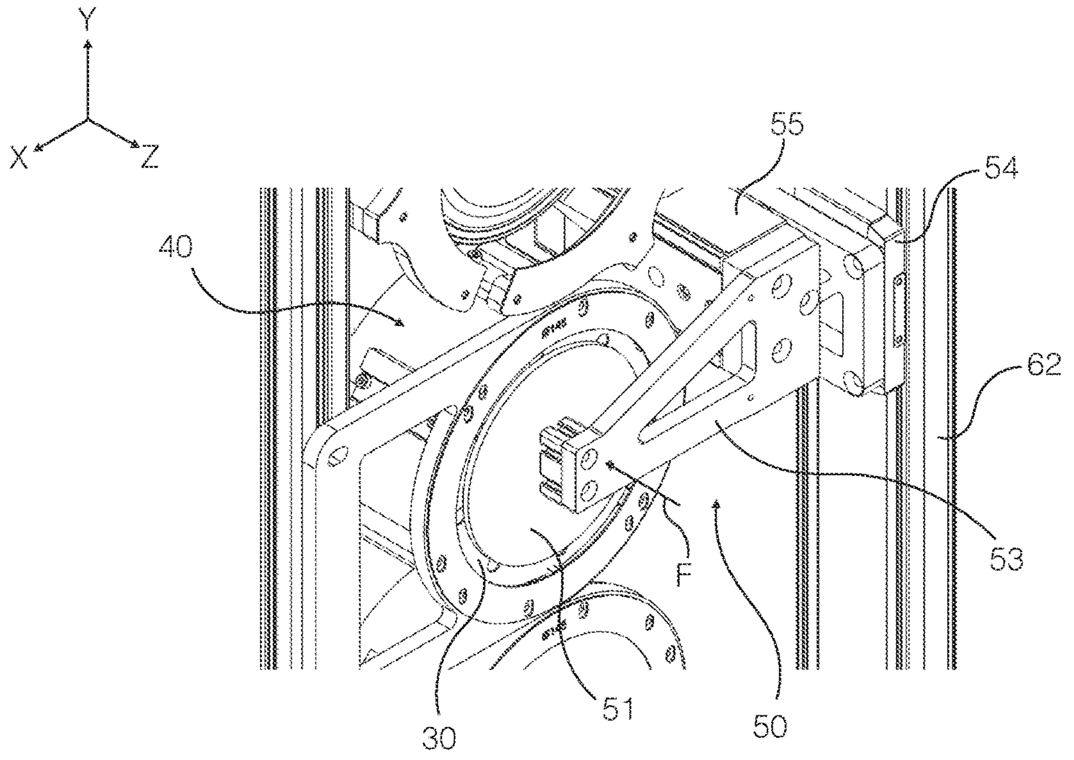

Next, with reference to FIG. 14*c*, after having come into contact with the foremost abrading product 30, the gripping plate 51 exerts force F, as effected by the second motion actuator 55 onto the foremost abrading product 30. Consequently, the grip between the foremost abrading product 30 and the gripping elements 52 becomes firmer. In addition, the plunger 41 of the magazine 40 gets, with the one or more abrading products 30 between the plunger 41 and the gripping plate 51 pushed back, i.e. away from the dispensing opening 47. If the magazine 40 is equipped with bristle unit(s) as movement-resisting elements 45, the bristles of the bristle unit(s) become consequently bent backwards towards the plunger 41.

Herein, the becoming of firmer of the grip between the foremost abrading product 30 and the gripping elements 52 may be further may be further improved by configuring the plunger to exert a lesser force F against the force F exerted by the gripping plate 51 and/or maintaining the force F exerted by the gripping plate 51 for while such as for 1, 2, 3, 4 or 5 seconds.

Figure 14D:
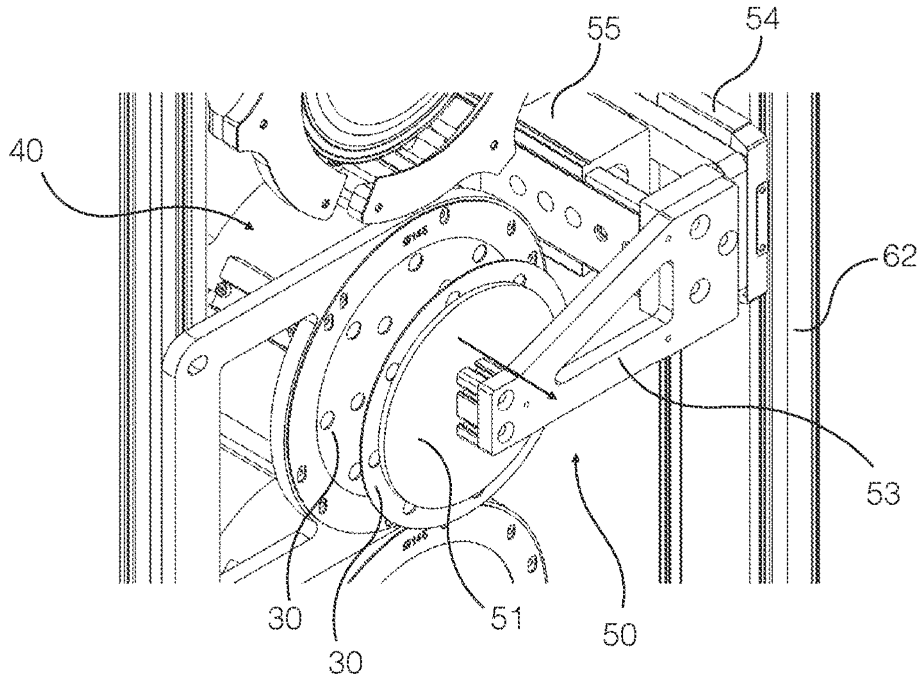

Next, with reference to FIG. 14*d*, the gripping device 50 retracts, as effected by the second motion actuator 55, the gripping plate 51 away from the magazine 40 with the abrading product 30 gripped onto the gripping plate 51. During such retraction, the bristles of the bristle unit(s) as movement-resisting elements 45 straighten, i.e. orient towards the respective center of the housing 44 of the magazine 40. Thereby, the bristles penetrate into between the abrading products 30 in the magazine 40—in case the magazine 40 contains more abrading products 30 than the one gripped onto the gripping plate 51. Thus, when the gripping plate 51 pulls the gripped abrading product 30 out from the dispensing opening 47, the rest of the abrading products 30 are withheld within the magazine 40 by the bristles of the bristle unit(s) as movement-resisting elements 45. Thereby, the bristle unit(s) as movement-resisting elements 45 provide the beneficial technical effect of separating the abrading products 30 from each other, thereby preventing more than one abrading products 30 from being pulled at once from the magazine 40.

Upon completion of the steps just described, the gripping device 50 has picked up an abrading product 30 for delivery to elsewhere in the attacher 3, such as to the loading device 80 or to a machine vision-providing arrangement.

The loading device 80 according to the disclosed solution is illustrated according to an example in FIGS. 12*a* to 12*c*.

The loading device 80 comprises as main elements a plurality of collar elements 81, a plunger 82 and a support 83 by means of which the loading device 80 may be rigidly mounted, for example to a frame 60. The loading device 80 additionally comprises a housing 84 via which the plunger 82 and the one or more collar elements 81 may be connected to the support 83, though it is conceivable that the housing 84 and the support 83 may take the form of a unitary object.

The collar elements 81 are configured to move radially outwards to an "open" position as depicted 12*a* and 12*b* as well as radially inwards to a "closed" position as depicted in FIG. 12*c*. Therefore, the collar elements 81 can allow an abrading product 30 to travel past the collar elements 81 when in the "open" position as well as prevent an abrading product 30 from travelling past the collar elements 81 when in the "closed" position. To achieve this functionality, the collar elements 81 are to be dimensioned such that in the "closed" position they define an inner opening with a circumference smaller than the circumference of an abrading product 30 being processed, and in the "open" position they define an inner opening with a circumference greater than the circumference of an abrading product 30 being processed.

Figure 15A:
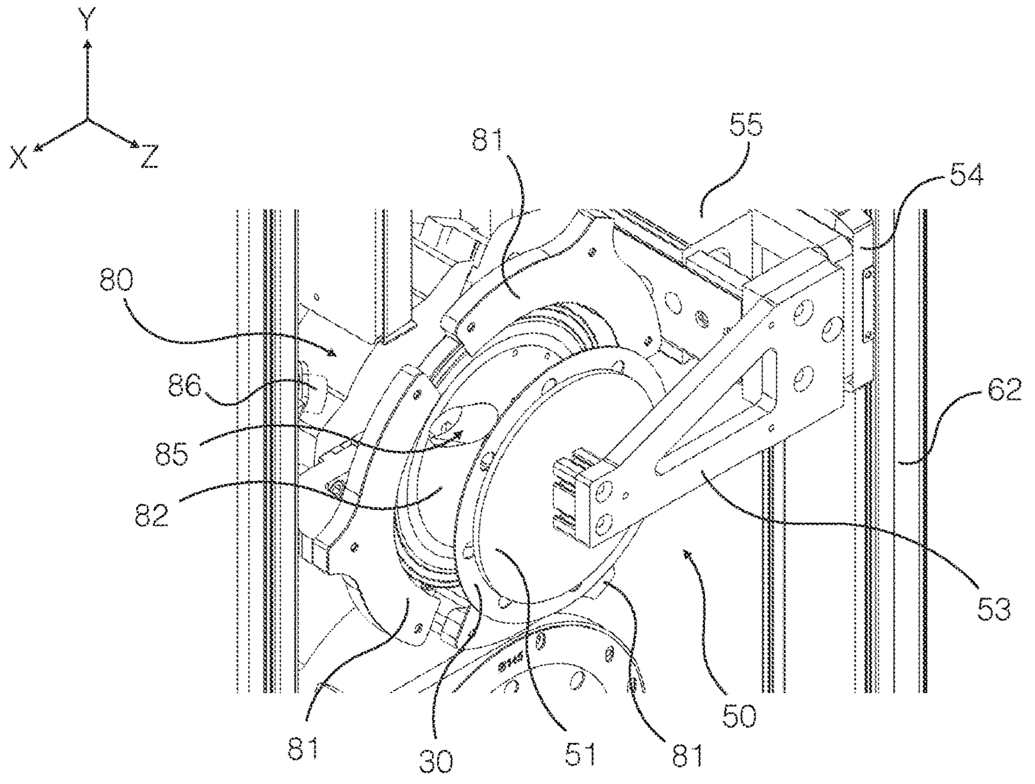
Figure 15B:
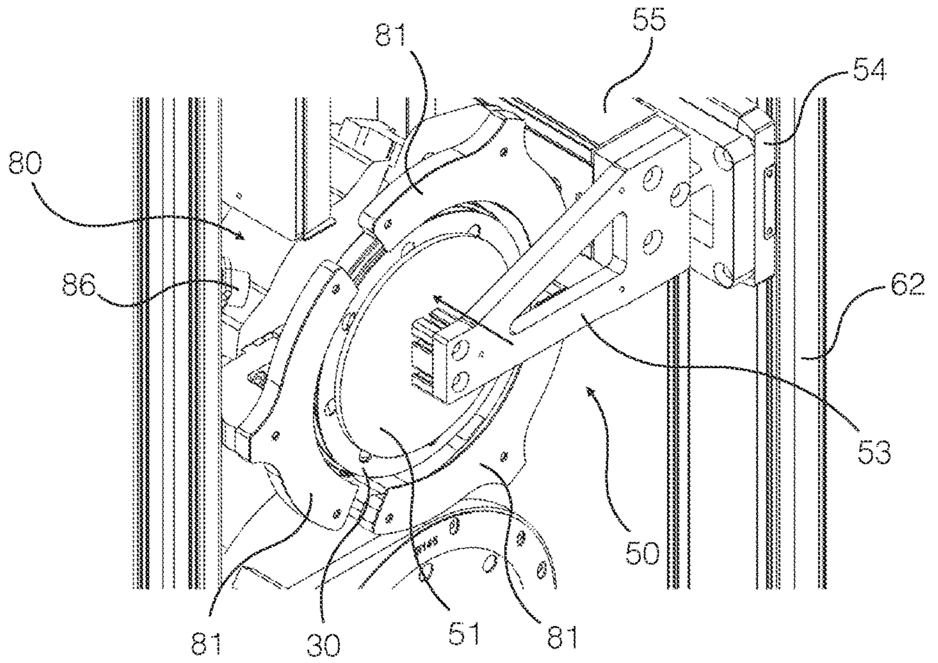

Thus, while the collar elements 81 are in the "open" position, the gripping device 50 may deliver an abrading product 30 in the vicinity of the plunger 82, as illustrated sequentially in FIGS. 15*a* and 15*b*.

The plunger 82, in turn, is configured to be capable of controllably moving into contact and away from contact with the collar elements 81, as illustrated in FIGS. 12*a* and 12*b*. As a person skilled in the art readily understands, such a functionality may be brought about with a linear motor or a pneumatic cylinder arrangement (not illustrated), which may be housed within the housing 84. The same applies to the movement of the collar elements 81 between the "open" and the "closed" position as described above.

Thereby, the plunger 82 and the collar elements 81 can work in a coordinated manner in pinching an abrading product 30 between the plunger 82 and the collar elements 81, namely by moving the collar elements 81 into the "closed" position and thereafter moving the plunger 82 towards the collar elements 81 to such an extent that the abrading product 30 becomes squeezed, i.e. pinched, between the plunger 82 and the collar elements 81. Towards such end, the outer circumference of the plunger 82 is to be greater than the circumference of the opening defined by the collar elements 81 in the "closed" position for the peripheral regions of the plunger 81 to come into the contact with the collar elements 82—via the abrading product 30 if inserted therein.

Optionally, the loading device 80 may comprise a sensor 86, for example an optical sensor 86, adapted for detecting the presence and/or the absence of an abrading product 30 in the immediate vicinity of the plunger 82. For such functionality, the plunger 82 may be provided with an aperture 85 through which the sensor 86 may detect the presence and/or the absence of an abrading product 30. Such a sensor 86 provides the beneficial technical effect of providing the attacher 3 with a capability of detecting operating errors such as the loading device 80 failing to pinch an abrading article 30 as described above, in which case, for example, the detected failed operation may be retried instead of permitting the attaching process to erroneously proceed further possibly requiring manual intervention subsequently.

Consistently with the above, the loading device 80 may be configured to interact with the gripping device 50 as follows and as illustrated stepwise in FIGS. 15*a* to 15*d*. Such process of interaction also constitutes a part of the method for attaching an abrading product 30 according to the disclosed solution, and thereby a method for providing the loading device 80 with an abrading product 30.

First, and referring to FIG. 15*a*, the gripping device 50, with an abrading product 30 gripped onto the gripping plate 51, moves, for example along the linear guide 62, to a position at the loading device 80, whereafter the loading device 80 moves the collar elements 81 into the "open" position if not already in this position. As a precondition to this step, the sensor 86 may be employed to verify that the loading device 80 is vacant to receive an abrading product 30, i.e. that there is no abrading product 30 already in the immediate vicinity of the plunger 82.

Next, and referring to FIG. 15*b*, the gripping device 50 with an abrading product 30 gripped moves, as effected by the second motion actuator 55, the gripping plate 51 with the abrading product 30 past the collar elements 81 towards the plunger 82. The sensor 86 may be employed to verify the consequent arrival of the abrading product 30 into the immediate vicinity of the plunger 82. Alternatively, or in addition, the plunger 82 or the gripping device 50 may be provided with a force sensor adapted to indicate a physical contact between the gripping plate 51—here, with the abrading product 30 gripped—and the plunger 82.

Figure 15C:
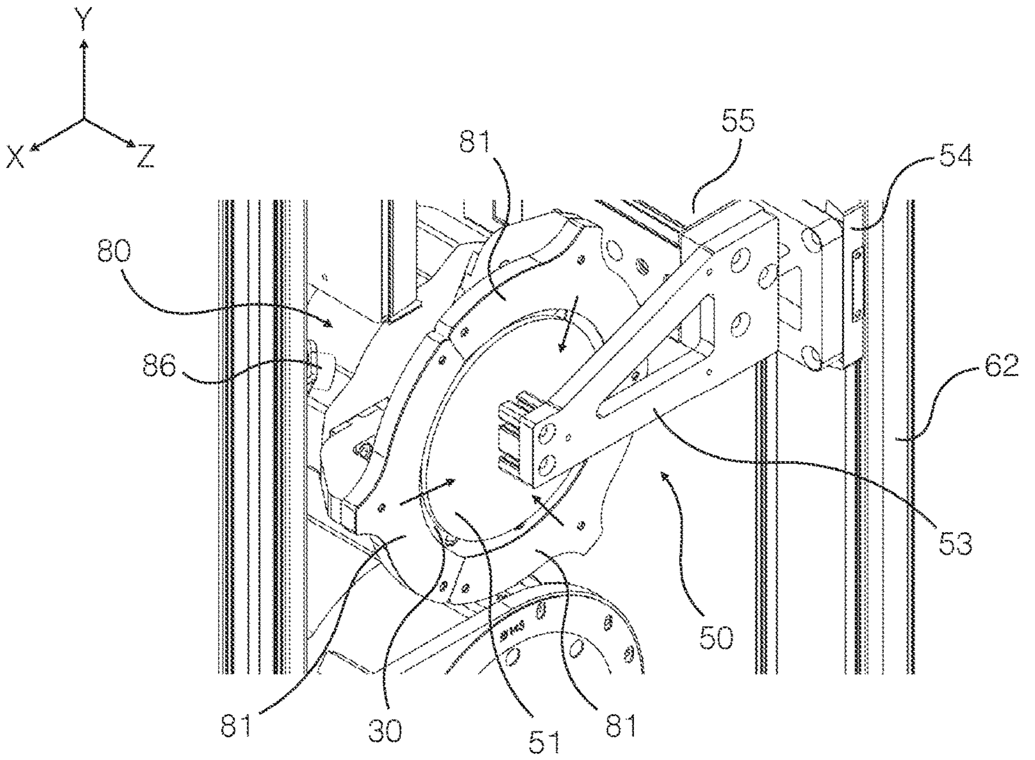

Next, and referring to FIG. 15*c*, the collar elements 81 move radially inwards into the "closed" position. As already noted above, the abrading plate 51 is to be smaller in surface area than the abrading products 30 to be gripped and, furthermore, smaller in surface area than the inner opening defined by the collar elements 81 in the "closed" position in order to allow the abrading plate 51 to retract from between the collar elements 81 in the "closed" position so as to detach from the abrading product 30—as described below.

Next, though not visible in FIG. 15*c*, the plunger 82 moves towards the collar elements 81 to the point of providing sufficient force F for the abrading product 30 to be pinched between the plunger 82 and the collar elements 81. To accommodate abrading products 30 of various thicknesses, the loading device 80 may be in communication via a communication pathway 91 with an instructions-giving device 90 such as a programmable logic which may provide the loading device 80 with information about the thickness of the abrading product 30 at the loading device 80 whereby the plunger 82 may be moved towards the collar elements 81 a distance suitable for the abrading product 30 at the loading device 80. Alternatively, or in addition, the plunger 82 may be equipped with a force sensor capable of indicating when the pinching force exerted by the plunger 82 is sufficient whereby the movement of the plunger 82 towards the collar elements 81 may be discontinued.

Figure 15D:
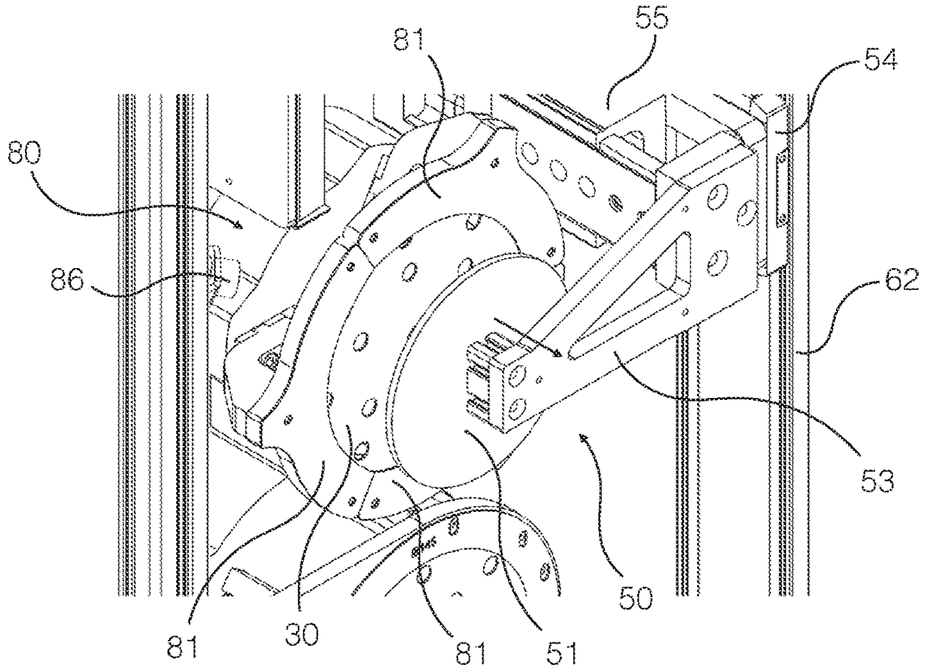

Next, and referring to FIG. 15*d*, the abrading plate 51 retracts away from the loading device 80 leaving the abrading product 30 at the loading device 80 as pinched between the plunger 82 and the collar elements 81.

Next, the gripping device 50 may move away from the position at the loading device 80, whereby the abrading product 30 pinched at the loading device 80 becomes available for attaching to an abrading tool 4.

The loading device 80 may be configured to interact with an abrading tool 4 as follows and as illustrated stepwise in FIGS. 16*a* to 16*d*. Such process of interaction also constitutes a part of the method for attaching an abrading product

30 according to the disclosed solution, and thereby a method for providing the abrading tool 4 with an abrading product 30.

As is obvious to a person skilled in the art, the following is premised on the abrading tool 4 not already having such an abrading product 30 as is to be attached—for example as a result of a previous such abrading product 30 having been detached with the detacher 2 as described above—but instead having a vacant gripping means 34 available to receive an abrading product 30 to be attached. Herein it must, however, be appreciated that the attaching procedure such as one described below may be performed more than once to furnish an abrading tool 4 with desired abrading products 30 such as first attaching an interface pad 32 and immediately thereafter attaching an abrasive article 31 before commissioning the abrading tool 4 for abrading.

Figure 16A:
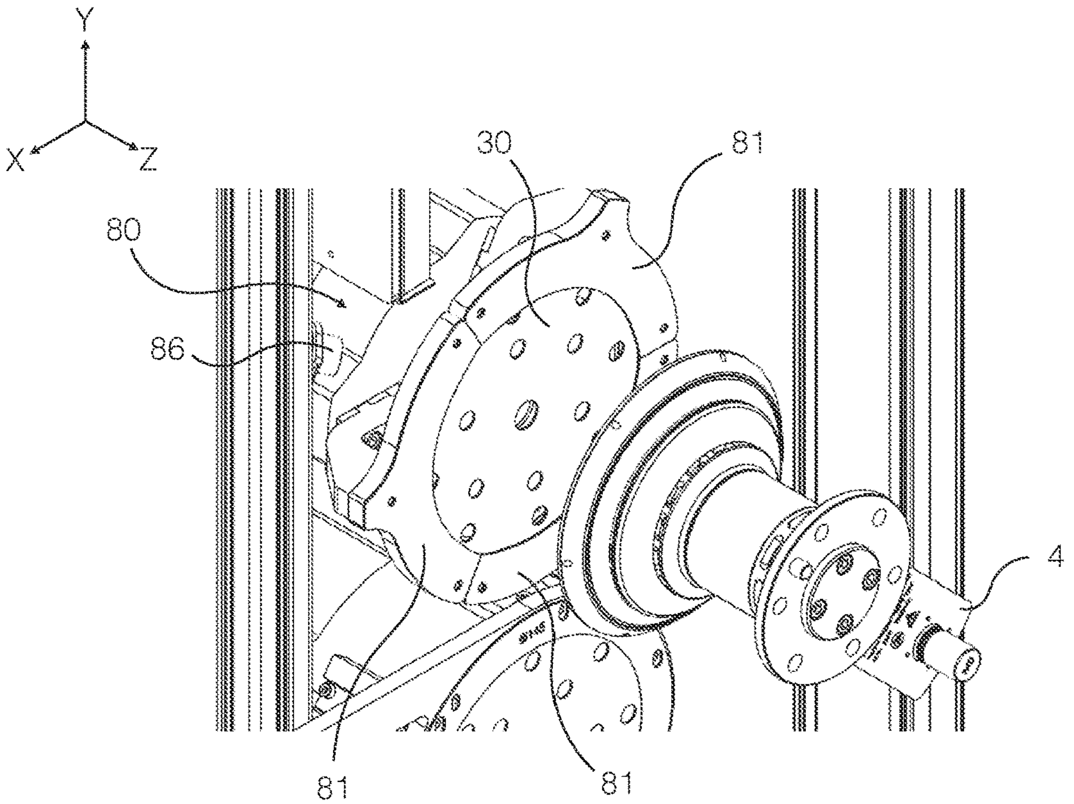

First, and referring to FIG. 16*a*, the abrading tool 4 is moved—for example by an abrading robot 5 or equivalent (omitted from form FIGS. 16*a* to 16*d* for illustrative clarity)—to a position at the loading device 80 having an abrading product 30 pinched as described above and available for attaching to an abrading tool 4.

Figure 16B:
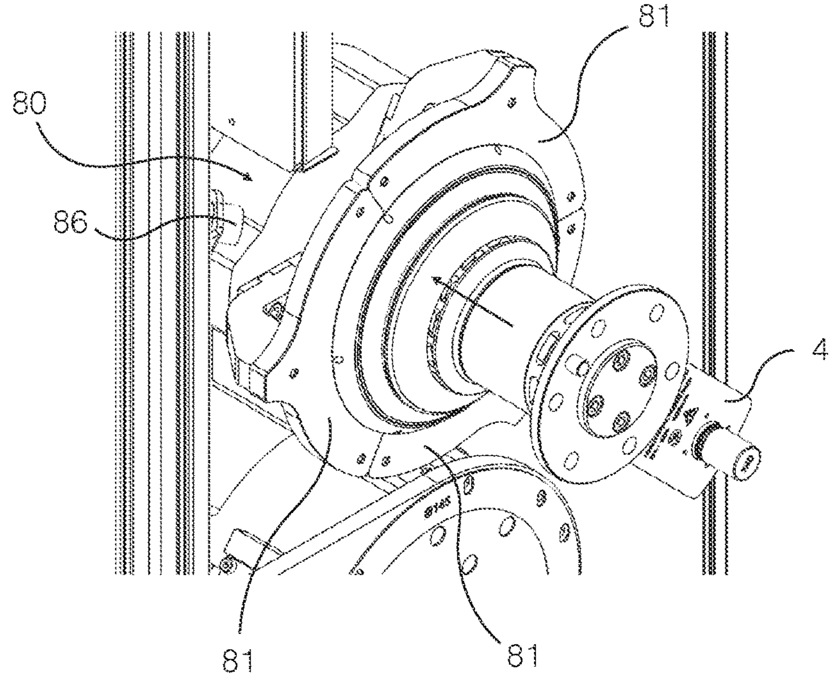

Next, and referring to FIG. 16*b*, the abrading tool 4 is moved towards and into contact with the abrading product 30. To detect such contact, the plunger 82 of the loading device 80 and/or abrading robot 5 or equivalent having the abrading tool 4 may be provided with a force sensor or equivalent adapted to indicate a physical contact between the abrading tool 4 and the abrading product 30. Upon such contact—and as is obvious to a person skilled in the art—the exposed gripping surface of the abrading product 30 becomes gripped onto the gripping means 34 on or attached to the abrading tool 4 such as the gripping surface of an interface pad 32 or a backing pad 33. Thereby, the abrading tool 4 is equipped with the abrading product 30.

Figure 16C:
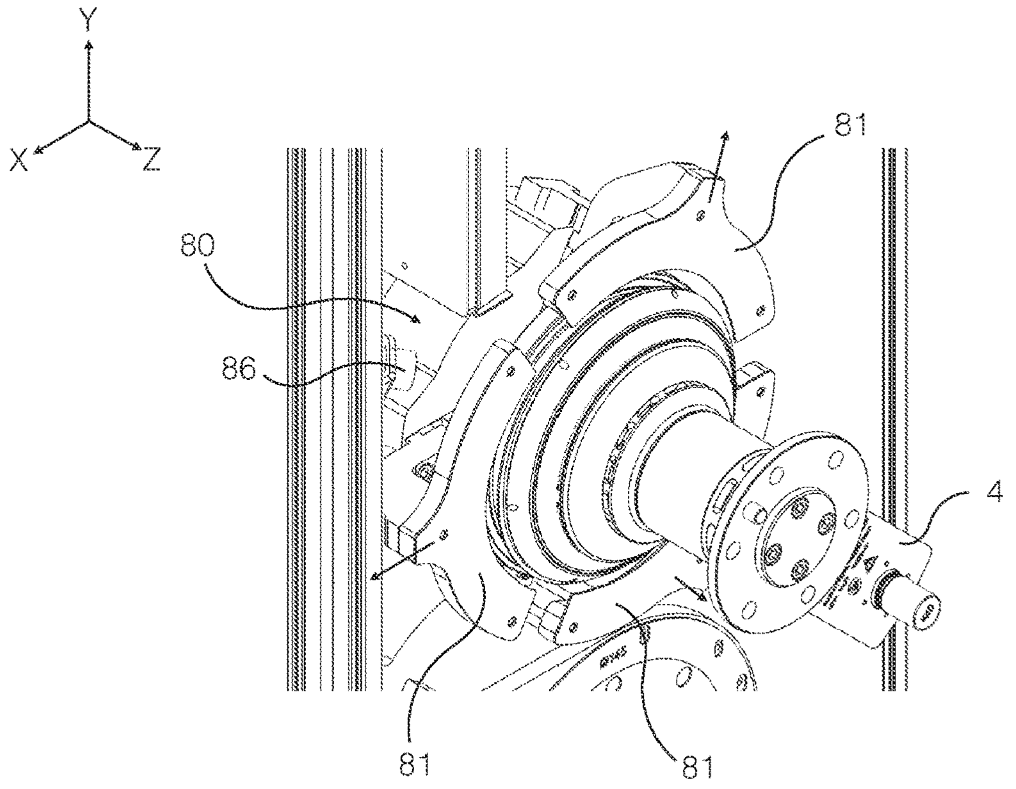

Next, and referring to FIG. 16*c*, the collar elements 81 of the loading device 80 are moved to the "open" position, whereby the abrading product 30 is released from pinching between the collar elements 81 and the plunger 82 of the loading device 80. To facilitate such releasing, the plunger 82 may be retracted away from the collar elements 81 before or simultaneously with moving the collar elements 81 to the "open" position.

Figure 16D:
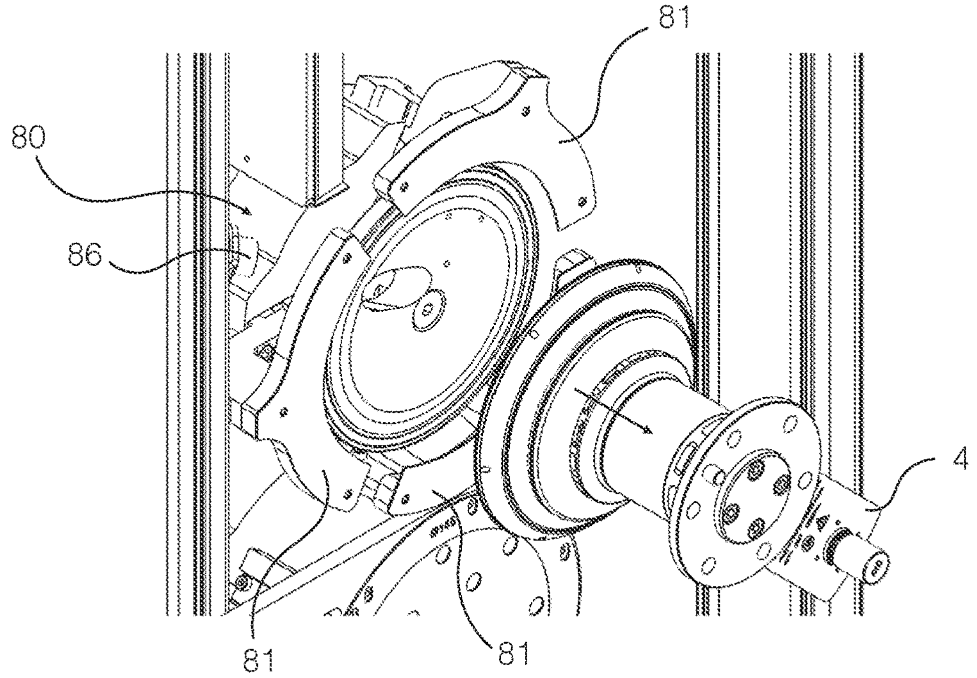

Next, and referring to FIG. 16*d*, the abrading tool 4 thusly equipped with the abrading product 30 retracts away from the loading device 80 and may be commissioned for abrading.

With reference to FIG. 11, the attacher 3 may, as an additional option, comprise means for providing machine vision capabilities such as a camera 70. To enhance machine vision capabilities, the camera 70 may be accompanied with one or more flashes 71 for improved illumination. Such means, such as the camera 70 and the flash(es) 71 may be attached to the frame 60 or to an auxiliary frame 61 attached to the frame 60, as is illustrated in FIG. 9.

Such means for providing machine vision capabilities 70,71 may be employed for highly advantageous purposes in case the attached abrading products 30 or at least some of them are perforated, i.e. comprise aperture patterns. As a person skilled in the art readily understands, in such a case, the abrading tool 4 most likely comprises also equivalent element(s), such as a backing pad 33, comprising matching aperture patterns. In such a case, the above-mentioned aperture patterns require alignment, for example to allow efficient abrading debris extraction through aligned apertures.

Firstly, the means for providing machine vision capabilities 70,71 may be employed for detecting aperture patterns in the abrading product 30 to be attached. Towards this end, the gripping device 50 may deliver the gripped abrading product 30 to a position at the machine vision capabilities such as the camera 70 and the flash(es) 71, as illustrated in FIG. 17*c*, wherein the aperture pattern and its rotational position on the abrading product 30 may be detected and communicated via a communication pathway 91 to an instructions-giving device 90 such as a programmable logic. Such detection may be performed, for example, as an additional step between the gripping device 50 picking up the abrading product 30 from a magazine 40 and the gripping device 50 depositing the abrading product to the loading device 80.

As is apparent for a person skilled in the art, the instructions-giving device 90 may be provided with an algorithm such as an executable computer program for recording aperture locations as detected in the form of a photographic image by camera 70 and the flash(es) 71, and subsequently storing these aperture locations in memory for subsequent use.

Secondly, the means for providing machine vision capabilities 70,71 may be employed for detecting aperture patterns in that element on or attached to an abrading tool 4 which is to receive an abrading product 30 to be attached. Towards this end, the abrading tool 4 may be brought to a position at the machine vision capabilities such as the camera 70 and the flash(es) 71, as illustrated in FIG. 17*c*, wherein said aperture pattern and its rotational position may be detected and communicated via a communication pathway 91 to an instructions-giving device 90 such as a programmable logic. Such detection may be performed, for example, as an additional step before bringing the abrading tool 4 at the loading device 80 for picking up the abrading product 30 to be attached.

With the aperture patterns in the abrading product 30 and on the abrading tool 4 thusly detected and recorded, the abrading tool 4 may be appropriately rotated and accurately positioned—for example by an robot 5 or equivalent device having the abrading tool 4—so as to receive the abrading product 30 in such a manner that the aperture patterns in the abrading product 30 to be attached and on the abrading tool 4 become aligned. Towards this end, such rotating and positioning instructions may be communicated to the robot 5 or equivalent by the instructions-giving device 90 via a communication pathway 91.

Such machine vision-based process may advantageously be employed also in the case of abrading products 30 not comprising any apertures for accurately positioning on the X-Y plane that element on or attached to an abrading tool 4 which is to receive an abrading product 30 to be attached.

In view of and consistently with the preceding, and with reference to FIGS. 17*a* to 17*h*, the attaching of an abrading product 30 to an abrading tool 4 ready to receive the abrading product 30 may unfold stepwise as follows. Such a process also constitutes a method for attaching an abrading product 30 according to the disclosed solution.

Figure 17A:
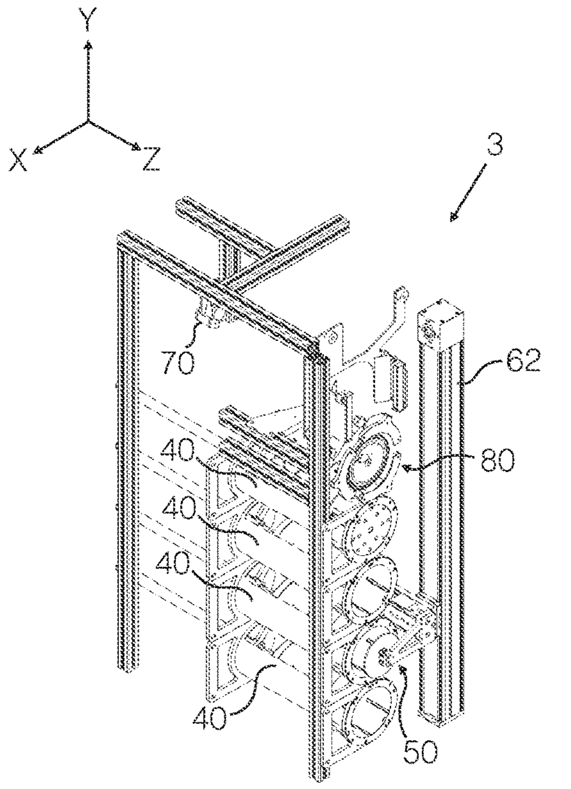
Figure 17B:
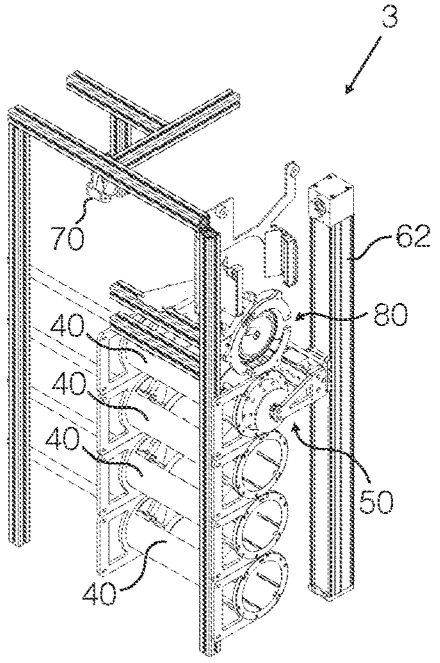
Figure 17C:
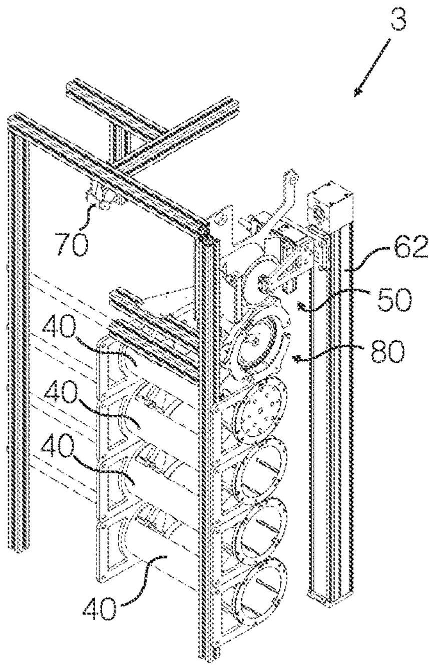

First, and with reference to FIGS. 17*a* and 17*b*, the gripping device 50 is moved to a magazine 40 containing a desired abrading product 30, whereafter the gripping device 50 grips that abrading product 30.

Next, and with reference to FIG. 17*c*, in case the abrading product 30 comprises apertures, the gripping device 50 may be moved together with the abrading product 30 to the position comprising machine vision capabilities 70,71, wherein the aperture pattern of the abrading product 30 may be recorded.

Figure 17D:
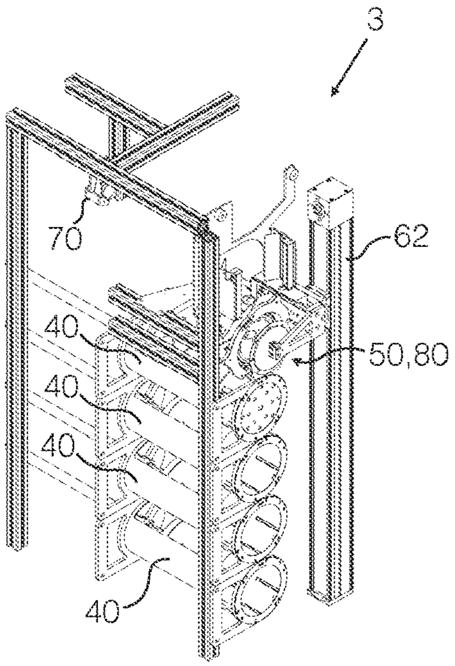

Next, and with reference to FIG. 17*d*, the gripping device 50 is moved together with the abrading product 30 to a loading device 80, followed by having the loading device 80 pinch the abrading product 30, whereafter the gripping device 50 is retracted away from the loading device 80 and the pinched abrading product 30, and is then moved away from the loading device 80.

Figure 17E:
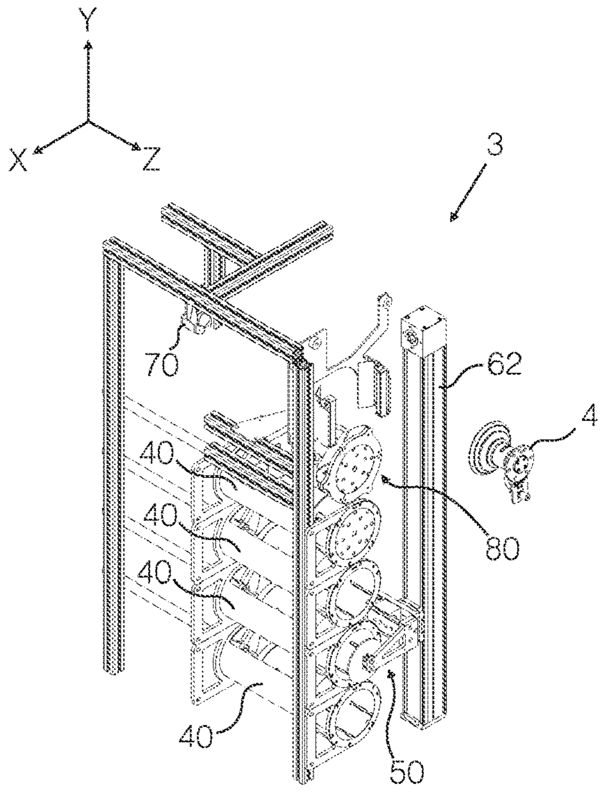

Next, and with reference to FIG. 17*e* the abrading tool 4 is moved towards the attacher 3. The possible device having the abrading tool 4 such as a robot 5 or equivalent is omitted for illustrative clarity from FIGS. 17*e* to 17*h*.

Figure 17F:
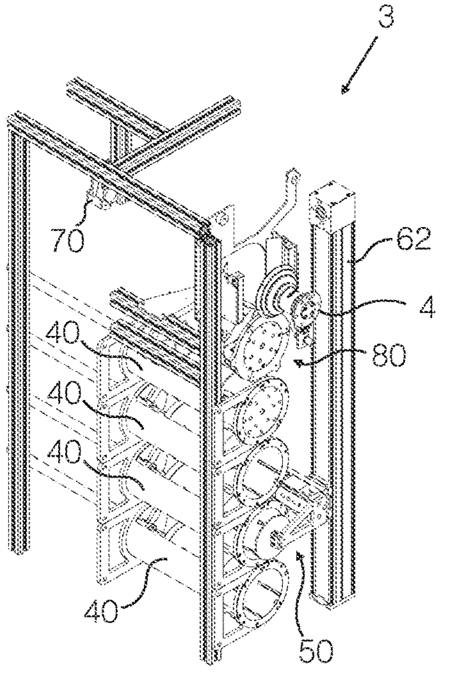
Figure 17G:
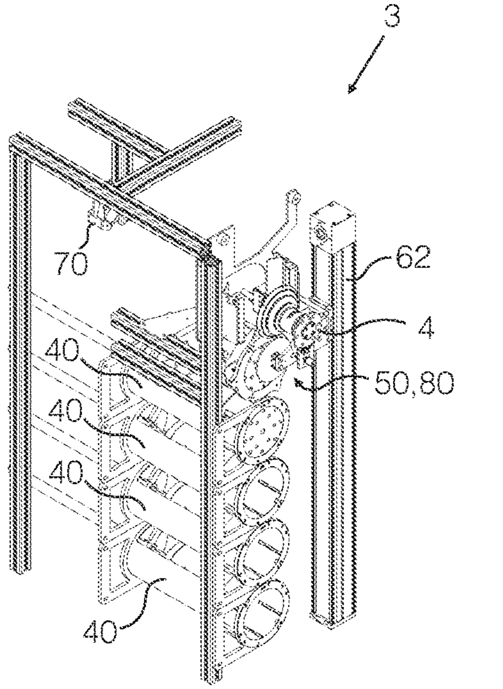

Next, and with reference to FIG. 17*f*, in case the element on or attached to the abrading device 4 receiving the abrading product 30 comprises apertures, the abrading device 4 may be moved to the position comprising machine vision capabilities 70,71, wherein the aperture pattern of said element on or attached to the abrading device 4 may be recorded. Followed by such recording, the abrading device 4 may be rotated so as to have said aperture pattern rotationally matched to that of the abrading product 30 in the loading device 80.

In this pattern-detecting conjunction, and with reference to FIG. 11*b*, the gripping device 50 may be equipped with a lower blinder arrangement 73 in order to enhance image quality in machine vision in which case the gripping device 50 may be moved next to the abrading tool 4 before recording the aperture pattern as described just above. In addition, or alternatively, there may be an upper blinder arrangement 72, for example, as incorporated in a flash arrangement 71 as illustrated in FIG. 11*a* according to an example.

Figure 17H:
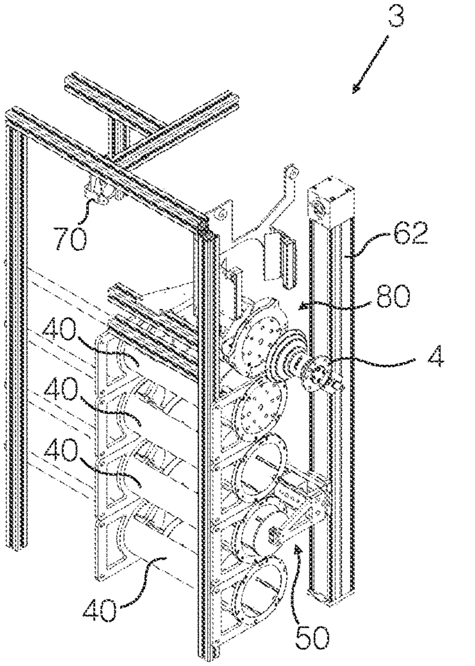

Next, and with reference to FIG. 17*h*, the abrading tool 4 is moved to the loading device 80, whereafter the abrading tool 4 may be moved into contact with the abrading product 30, followed by releasing the abrading product 30 form the loading device 80.

Thereafter, the abrading tool 4 is moved away from the loading device and may be commissioned to abrading.

According to the disclosed solution, the attacher 3 may conduct the steps illustrated in FIGS. 17*a* to 17*d*, i.e. retrieve an abrading product 30 to be attached and place it in the loading device 80 in the absence of an abrading tool 4. Thus, the attacher 3 according to the disclosed solution may beneficially prepare the next abrading product 30 to be attached—possibly from a variety of different abrading products 30 in different magazines 40—ready for attaching already before the attaching has actualized.

It is to be appreciated that the same principles apply in the case the device 1 for changing abrading products 30 comprising the attacher 3 is utilized, as described above, by several abrading tools 4 such as several robots 5 or equivalent each equipped with an abrading tool 4. In such a case, the attacher 3 loads in the loading device 80 the next abrading product 30 in a sequence of abrading products 30 due for the different abrading tools 4—for example as instructed by the instructions-giving device 90 keeping record of such a sequence.

While the attacher 3 according to the disclosed solution may be configured so that its key elements, the magazine(s) 40 and the loading device 80 are vertically stacked with the gripping device 50 moving vertically, as illustrated in FIG. 9, any other orientation of configuration is equally possible while otherwise adhering to the principles set forth above. Moreover, by mounting the gripping device 50 on a robot or an equivalent 3-dimensionally moving arm arrangement provides even more freedom in the mutual placement of the magazine(s) 40 and the loading device 80 as well as other required attacher 3 elements, while otherwise adhering to the principles set forth above.

As noted above, the device 1 for changing abrading products—comprising an detacher 2 according to the disclosed solution or an attacher 3 according to the disclosed solution or both—may advantageously comprise an instructions-giving device 90 which may be in data communication, via communication pathway(s) 91 with the detacher 2 and/or the attacher. Via such data communication, the instructions-giving device 90 may advantageously perform one or more of the following functionalities:

- for the detacher 2, provide instructions for adjusting the mutual distance between the table 10 and the blade 14,
- for the attacher 3, provide instructions for movement of the gripping device 50, such as for delivering abrading products 30 between the magazine(s) 40, the loading device 80 and/or the means of machine vision 70,71,
- for the device having the abrading tool 4 such as a robot 5 or equivalent, provide instructions for movement of the abrading tool 4, in the X-Y-Z coordinates and/or rotationally,
- detect the aperture patterns in the abrading product 30 and/or the element on or attached to the abrading tool 4 capable of receiving the abrading product 30 from the image captured by the means of machine vision 70,71, and
- keep a record of a sequence of abrading products 30 due for attaching to abrading tool(s) 4.

According to an example 1 of a device (1) for changing abrading products (30), the device (1) comprises an attacher (3), the attacher (3) comprising:

- one or magazines (40) adapted to receive and store a plurality of abrading products (30);
- a loading device (80) adapted to receive and hold an abrading product (30) for attachment to an abrading tool (4);
- a gripping device (50) comprising gripping means (52) and being adapted to
  - grip an abrading product (30) at the one or more magazines (40),
  - move from said one or more magazines (40) to the loading device (80) and
  - deposit the abrading product (30) at the loading device (80).

According to another example 2 of the device (1) according to example 1, the loading device (80) comprises

- a plurality of collar elements (81) adapted to move radially outward into an "open" position and radially inward into a "closed" position such that

- in the "open" position, the plurality of the collar elements (81) define an inner opening with a circumference larger than the circumference of the abrading product (30) and
- in the "closed" position, the plurality of the collar elements (81) define an inner opening with a circumference smaller than the circumference of the abrading product (30).

According to an example 3 of the device (1) according to example 2, the loading device (80) further comprises

- a plunger (82) adapted to controllably move into contact and away from contact with the plurality of the collar elements (81), thereby enabling the abrading product (30) to be pinched between and released from between the plunger (82) and the plurality of the collar elements (81).

According to an example 4 of the device (1) according to any of the examples 1-3, the gripping device (50) further comprises a first motion actuator (54) movably coupled with a linear guide (62) for effecting movement of the gripping device (50) at least between the one or more magazines (40) and the loading device (80) and a second motion actuator (55) adapted to move the gripping means (52) towards and away from at least the one or more magazines (40) and the loading device (80).

According to an example 5 of the device (1) according to any of the examples 1-4, the magazine (40) comprises a dispensing opening (47) at that side of the magazine (40) which faces the gripping device (50) when the gripping device (50) is at the magazine (40) and a plunger (41) adapted to push abrading product(s) (30) in the magazine (40) towards the dispensing opening (47).

According to an example 6 of the device (1) according to example 5, the magazine (40) further comprises, on the inner surface of its housing (44) at and/or near the dispensing opening (47), one or more movement-resisting elements (45) for resisting the movement of the abrading product(s) (30) in the magazine (40) relative to the dispensing opening (47).

According to an example 7 of the device (1) according to example 6, the one or more movement-resisting element(s) (45) is/are bristle unit(s) comprising bristles.

According to an example 8 the device (1) according to any of the examples 1-7, further comprises a camera (70) adapted to capture an image of an aperture pattern on the abrading product (30) and/or on the gripping means (34) of an abrading tool (4).

It is to be appreciated that such functionality as such is conventional in the field of industrial automation, and thus will be not elaborated on here.

The above-described examples are intended to explain the general idea and principles of the disclosed solution. Therefore, such examples are not to be taken as exhausting the ways in which the general idea and the principles of the disclosed solution may be implemented.

The invention claimed is:

1. A detacher to detach an abrading product from a gripping means of an abrading tool, the detacher comprising:

a base;

a table for receiving into contact the abrading product as mounted to the gripping means of the abrading tool, the abrading product having a thickness;

one or more column arrangements connecting the base to the table;

a blade adapted to penetrate in-between the abrading product and the gripping means of the abrading tool; and a mechanism to adjust a mutual distance (d) between the blade and a first face of the table to correspond to the thickness of the abrading product such that:

said mechanism to adjust the mutual distance (d) comprises an actuator, wherein said mechanism to adjust the mutual distance (d) is operable to adjust the mutual distance (d) to at least two different values in an absence of the abrading product, and said mechanism to adjust the mutual distance (d) is arranged to operate such that the blade and the table remain in parallel planes over an entire surface area of the blade regardless of a magnitude of the mutual distance (d), wherein the one or more column arrangements are adapted to vary a second mutual distance (h), the second mutual distance (h) extending parallel to the mutual distance (d) and corresponding to a distance between the base and a second face of the table, the second face of the table being located opposite the first face of the table, and wherein at least one of the one or more column arrangements comprises:

a hollow outer column, a telescopic inner column movably coupled within the outer column and capable of penetrating to inside the outer column, and one or more springs within the outer column that resist a penetrating movement of the inner column to inside of the outer column, whereby the one or more springs absorb an impact exerted by the abrading product onto the table.

2. The detacher according to claim 1, wherein the mechanism to adjust the mutual distance (d) between the first face of the table and the blade comprises:

a linear guide connected to the table, a shaft connected to the blade and movably coupled with the linear guide, and the actuator adapted to move the shaft relative to the linear guide.

3. The detacher according to claim 2, wherein the one or more column arrangements are adapted to vary the second mutual distance (h) between the base and the second face of the table, such that the table does not tilt in relation to the base regardless of the second mutual distance (h) between the base and the second face of the table, in a situation where the blade moves together with the table in relation to the base.

4. The detacher according to claim 1, wherein the one or more column arrangements are adapted to vary the second mutual distance (h) between the base and the second face of the table, such that the table does not tilt in relation to the base regardless of the second mutual distance (h) between the base and the second face of the table, in a situation where the blade moves together with the table in relation to the base.

5. A combination for changing abrading products, the combination comprising:

a robot, wherein the robot is equipped with an abrading tool; and an abrading product exchange system, comprising:

the detacher according to claim 1;

an abrading product attacher; and an instructions-giving programmable logic device in data communication, via one or more communication pathways, with the detacher at least for providing instructions for adjusting the mutual distance (d) between the first face of the table and the blade of said detacher.

6. The combination according to claim 5, wherein the instructions-giving programmable logic device is in data communication via the one or more communication pathways with a camera for recording an aperture pattern on the abrading product and/or for recording an aperture pattern on the gripping means of the abrading tool from an image captured with the camera.

7. The combination according to claim 5, wherein the abrading product attacher comprises:
a magazine, wherein the magazine is adapted to receive and house therein a plurality of abrading products and wherein each of the plurality of abrading products is adapted to be attached to the abrading tool equipped on the robot; and
a loading device, wherein the loading device is adapted to receive and hold one of the plurality of abrading products for attachment to the abrading tool equipped on the robot.

8. A method comprising:
providing the combination of claim 5;
providing an abrading product which is mounted to the gripping means of the abrading tool equipped on the robot;
adjusting the mutual distance (d) between the first face of the table and the blade to correspond to the thickness of the abrading product; and
detaching the abrading product from the abrading tool by causing the blade to penetrate in-between the abrading product and the gripping means of the abrading tool.

9. The method according to claim 8, wherein the method further comprises:
moving the robot on which the abrading tool is equipped to opposite the abrading product attacher of the abrading product exchange system;
engaging the gripping means of the abrading tool with a new abrading product disposed on a loading device of the abrading product attacher;
releasing the new abrading product from the loading device; and
retracting the robot from the abrading product attacher such that the abrading tool has mounted thereto the new abrading product.

* * * * *